(12) United States Patent
Kuromizu

(10) Patent No.: US 8,807,805 B2
(45) Date of Patent: Aug. 19, 2014

(54) LIGHTING DEVICE, DISPLAY DEVICE AND TELEVISION RECEIVER

(75) Inventor: Yasumori Kuromizu, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 222 days.

(21) Appl. No.: 13/395,465

(22) PCT Filed: Aug. 19, 2010

(86) PCT No.: PCT/JP2010/063993
§ 371 (c)(1),
(2), (4) Date: Mar. 12, 2012

(87) PCT Pub. No.: WO2011/033900
PCT Pub. Date: Mar. 24, 2011

(65) Prior Publication Data
US 2012/0169942 A1    Jul. 5, 2012

(30) Foreign Application Priority Data
Sep. 16, 2009  (JP) ................. 2009-214823

(51) Int. Cl.
*F21V 17/06*    (2006.01)

(52) U.S. Cl.
USPC ............ 362/433; 362/97.1; 362/249.01; 362/296.01; 362/310; 362/341

(58) Field of Classification Search
USPC ............ 362/97.1–97.3, 249.01, 249.02, 257, 362/260, 296.01, 310, 341, 433
See application file for complete search history.

(56) References Cited

U.S. PATENT DOCUMENTS

| 6,095,656 A | 8/2000 | Shimura et al. |
| 2003/0098840 A1 | 5/2003 | Nagatani |
| 2006/0109643 A1 | 5/2006 | Chang |
| 2006/0244891 A1 | 11/2006 | Tsubokura et al. |
| 2007/0009820 A1 | 1/2007 | Ueda |
| 2007/0053171 A1 | 3/2007 | Park |
| 2008/0174543 A1 | 7/2008 | Nagatani |
| 2009/0122224 A1 | 5/2009 | Ueda |

FOREIGN PATENT DOCUMENTS

| JP | 04-056001 A | 2/1992 |
| JP | 11-096822 A | 4/1999 |
| JP | 2003-162901 A | 6/2003 |

(Continued)

OTHER PUBLICATIONS

Official Communication issued in International Patent Application No. PCT/JP2010/063993, mailed on Sep. 14, 2010.
Shimizu, "Lighting Device, Display Device, and Television Receiver", U.S. Appl. No. 13/395,459, filed Mar. 12, 2012.
Kuromizu et al., "Lighting Device, Display Device and Television Receiver", U.S. Appl. No. 13/395,457, filed Mar. 12, 2012.

(Continued)

*Primary Examiner* — Meghan Dunwiddie
(74) *Attorney, Agent, or Firm* — Keating & Bennett, LLP

(57) ABSTRACT

To prevent uneven brightness in a backlight unit, a backlight unit 12 includes: a hot cathode tube 17 that is a light source; a chassis 14 housing the hot cathode tube 17; a reflection sheet 20 arranged inside the chassis 14 and configured to reflect light; an optical member 15 arranged on a light exit side with respect to the hot cathode tube 17; and a support member 21 including a support portion 26 that has an axis extending in a space inside the chassis 14 and supports the optical member 15 from a side opposite to the light exit side. The support member 21 has a pressing surface 28 enabled to press the reflection sheet 20 from the light exit side and the pressing surface crosses an axial direction of the support portion 26 and crosses a direction perpendicular to the axial direction.

27 Claims, 29 Drawing Sheets

(56) References Cited

FOREIGN PATENT DOCUMENTS

| JP | 2006-146126 A | 6/2006 |
| JP | 2006-308790 A | 11/2006 |
| JP | 2007-018903 A | 1/2007 |
| JP | 2007-073527 A | 3/2007 |
| WO | 2007/069382 A1 | 6/2007 |

OTHER PUBLICATIONS

Kuromizu, "Lighting Device, Display Device and Television Receiver", U.S. Appl. No. 13/395,462, filed Mar. 12, 2012.
Kuromizu, "Lighting Device, Display Device, and Television Receiver", U.S. Appl. No. 13/395,463, filed Mar. 12, 2012.
Kuromizu, "Lighting Device, Display Device and Television Receiver", U.S. Appl. No. 13/395,469, filed Mar. 12, 2012.

FIG.1
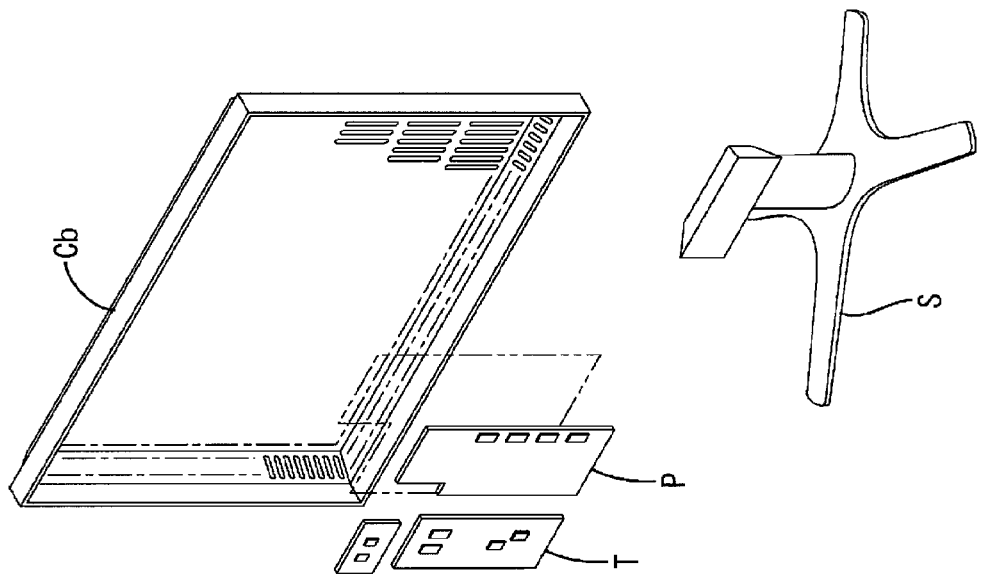
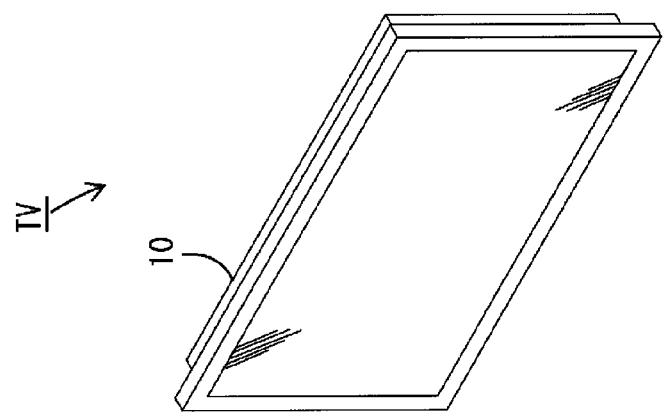
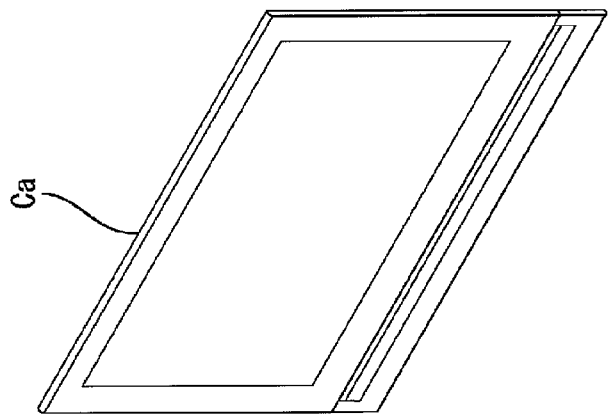

LIGHTING DEVICE, DISPLAY DEVICE AND TELEVISION RECEIVER

TECHNICAL FIELD

The invention relates to a lighting device, a display device and a television receiver.

BACKGROUND ART

A liquid crystal panel used for a liquid crystal display device such as a liquid crystal television, for example, does not emit light, and thus a backlight unit is required as a separate lighting device. This backlight unit is provided on a rear-surface side (on a side opposite to a display surface) of the liquid crystal panel. The backlight unit includes a chassis, a light source (such as a cold cathode tube), an optical member (such as a diffuser sheet) and a reflection sheet. The chassis is open on a surface facing the liquid crystal panel side. The light source is housed in the chassis. The optical member is arranged in the opening of the chassis and outputs light from the light source effectively toward the liquid crystal panel side. The refection sheet is laid in the chassis and configured to reflect light from the light source toward the optical member and the liquid crystal panel. A backlight unit of this kind is described in Patent Document 1, for example.

Patent Document 1: Japanese Unexamined Patent Publication No. 2006-146126

PROBLEMS TO BE SOLVED BY THE INVENTION

The refection sheet of the above backlight unit includes a bottom portion arranged along the inner surface of a bottom plate of the chassis and a rising portion rising from the bottom portion toward the optical member. The rising portion enables light reflected thereby to be directed toward the middle portion of a screen.

The rising portion of the reflection sheet rises from the bottom portion. Accordingly, the shape of the rising portion tends to be destabilized. Specifically, the angle at which the rising portion rises from the bottom portion is more likely to change, and deformation such as warping or bending is more likely to occur in the rising portion. This results in an unstable shape of the rising portion. If the shape of the rising portion is unstable, the direction of light reflected by the rising portion may also be destabilized, resulting in unevenness in the light emitted from the backlight unit.

DISCLOSURE OF THE INVENTION

The present invention was made in view of the foregoing circumstances, and aims at preventing uneven brightness in a lighting device.

MEANS FOR SOLVING THE PROBLEM

A lighting device of the present invention includes: a light source; a chassis housing the light source; a reflection sheet arranged inside the chassis and configured to reflect light; an optical member arranged on a light exit side with respect to the light source so as to face the light source; and a support member including a support portion that has an axis extending in a space inside the chassis and supports the optical member from a side opposite to the light exit side. The support member further has a pressing surface configured to press the reflection sheet from the light exit side and the pressing surface having a surface plane crossing an axial direction of the support portion and a direction substantially perpendicular to the axial direction.

With this configuration, the optical member can be supported by the support portion of the support member from the side opposite to the light exit side. On this basis, even if the reflection sheet is provided such that its plane surface crosses the axial direction of the support portion and crosses a direction perpendicular to the axial direction, the reflection sheet can be effectively pressed from the light exit side by the pressing surface of the support member. The shape of the reflection sheet is thereby maintained stably, whereby the directivity of light reflected therefrom can be stabilized. As a result, unevenness is less likely to occur in light emitted from the lighting device.

BRIEF DESCRIPTION OF THE DRAWINGS

FIG. 1 is an exploded perspective view illustrating a schematic configuration of a television receiver according to a first embodiment of the invention;

BEST MODE FOR CARRYING OUT THE INVENTION

First Embodiment

A first embodiment of the invention will be described with reference to FIGS. 1 to 13. First, a configuration of a television receiver TV including a liquid crystal display device 10 will be explained.

Figure 2:
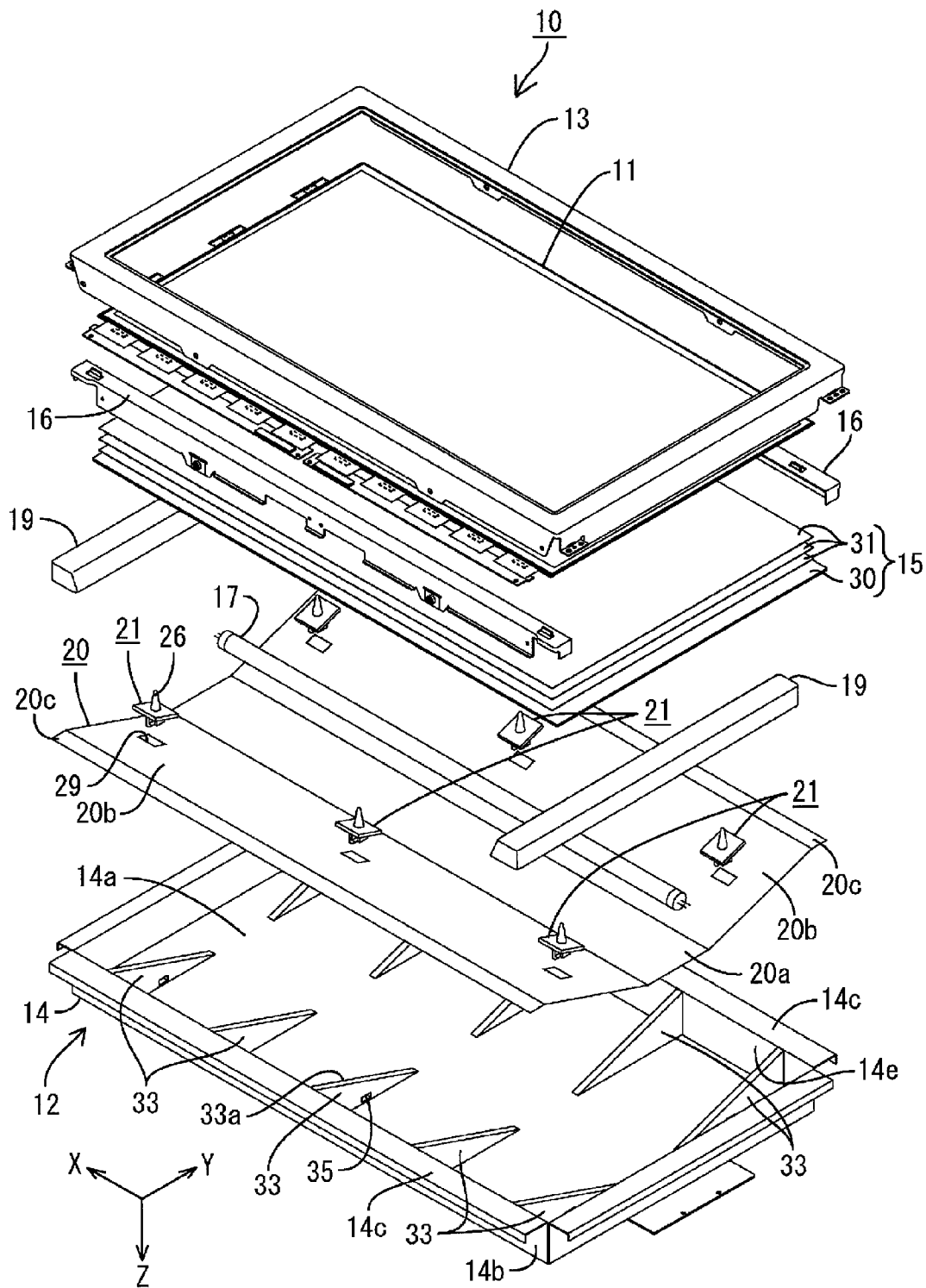
FIG. 2 is an exploded perspective view illustrating a schematic configuration of a liquid crystal display device included in the television receiver.
Figure 3:
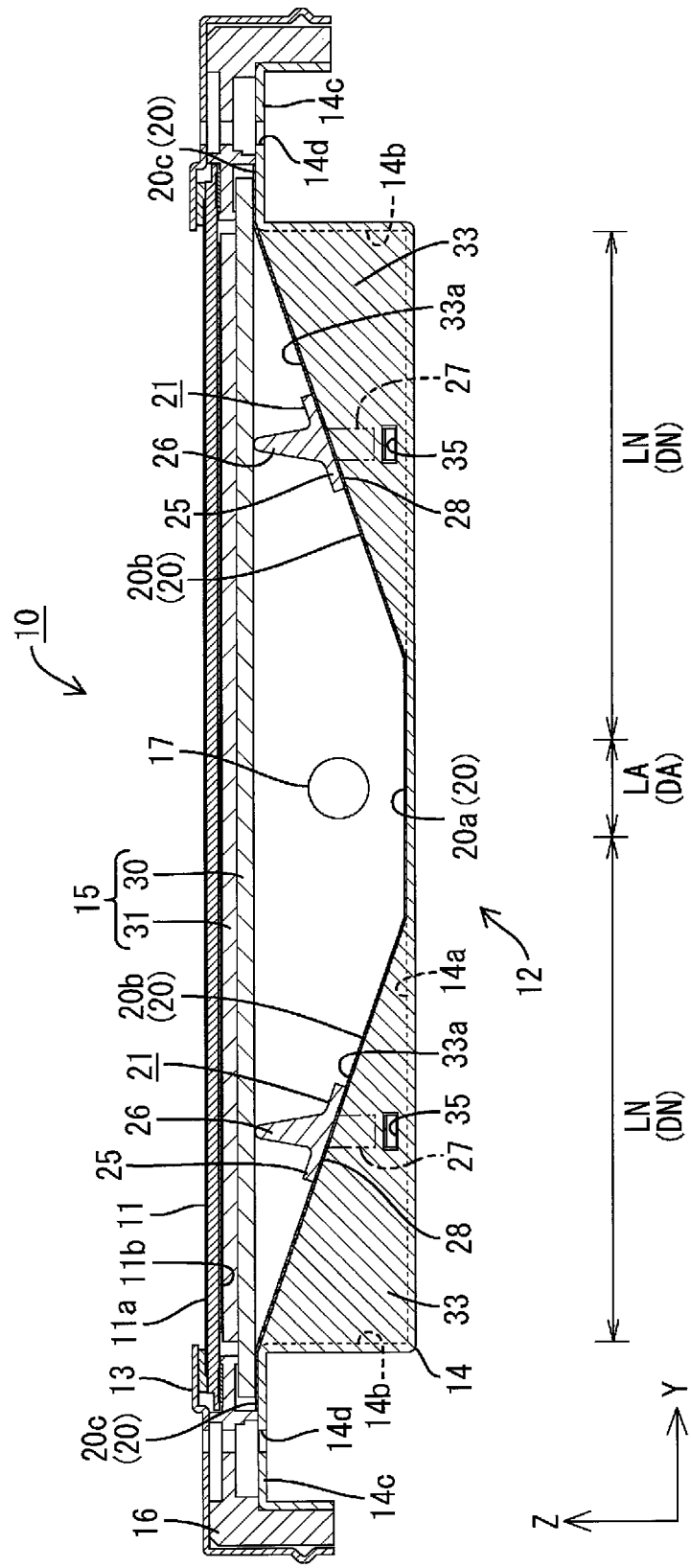
FIG. 3 is a cross-sectional view illustrating a sectional configuration taken along a direction along the short side of the liquid crystal display device.
Figure 4:
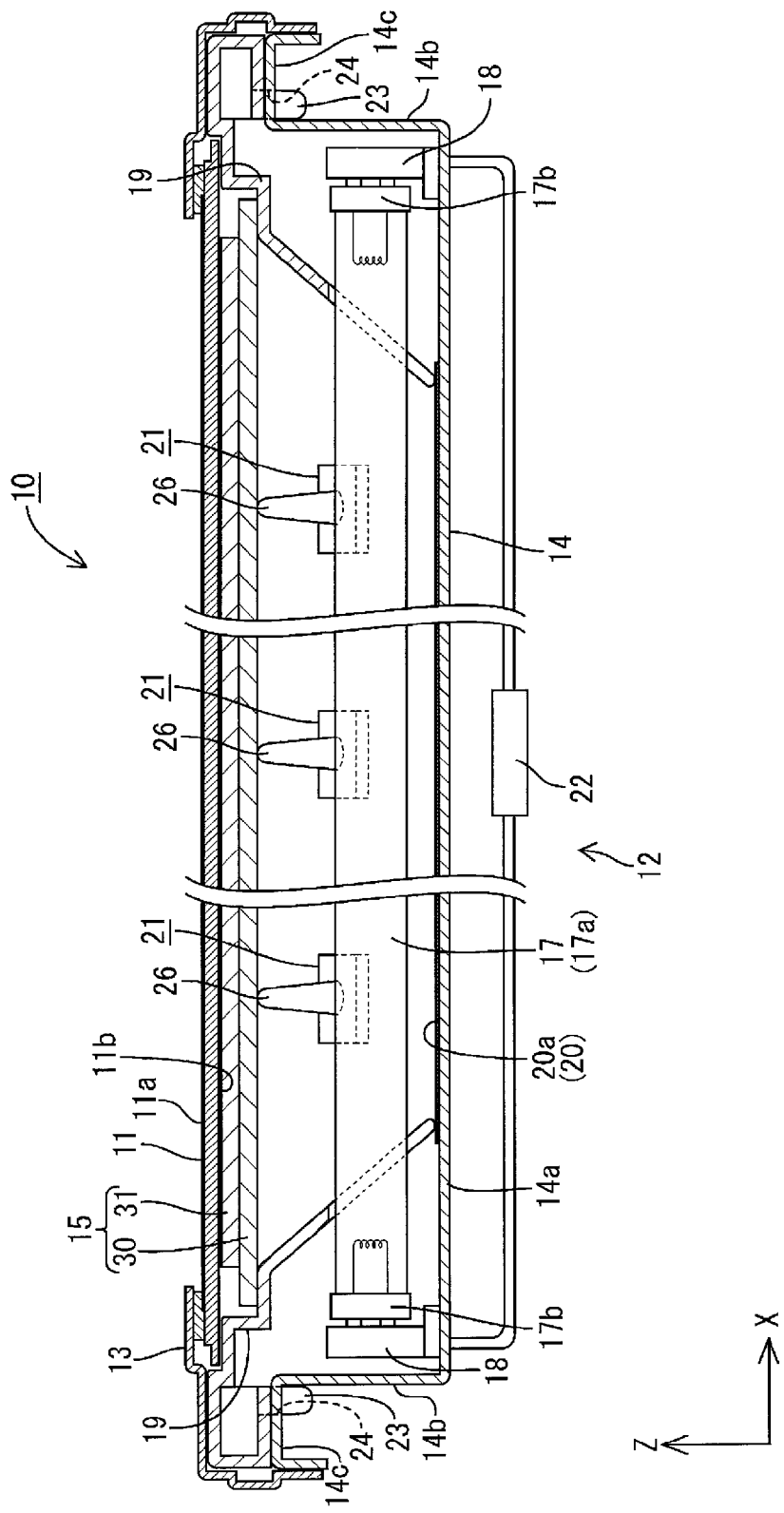
FIG. 4 is a cross-sectional view illustrating a sectional configuration taken along a direction along the long side of the liquid crystal display device.
Figure 5:
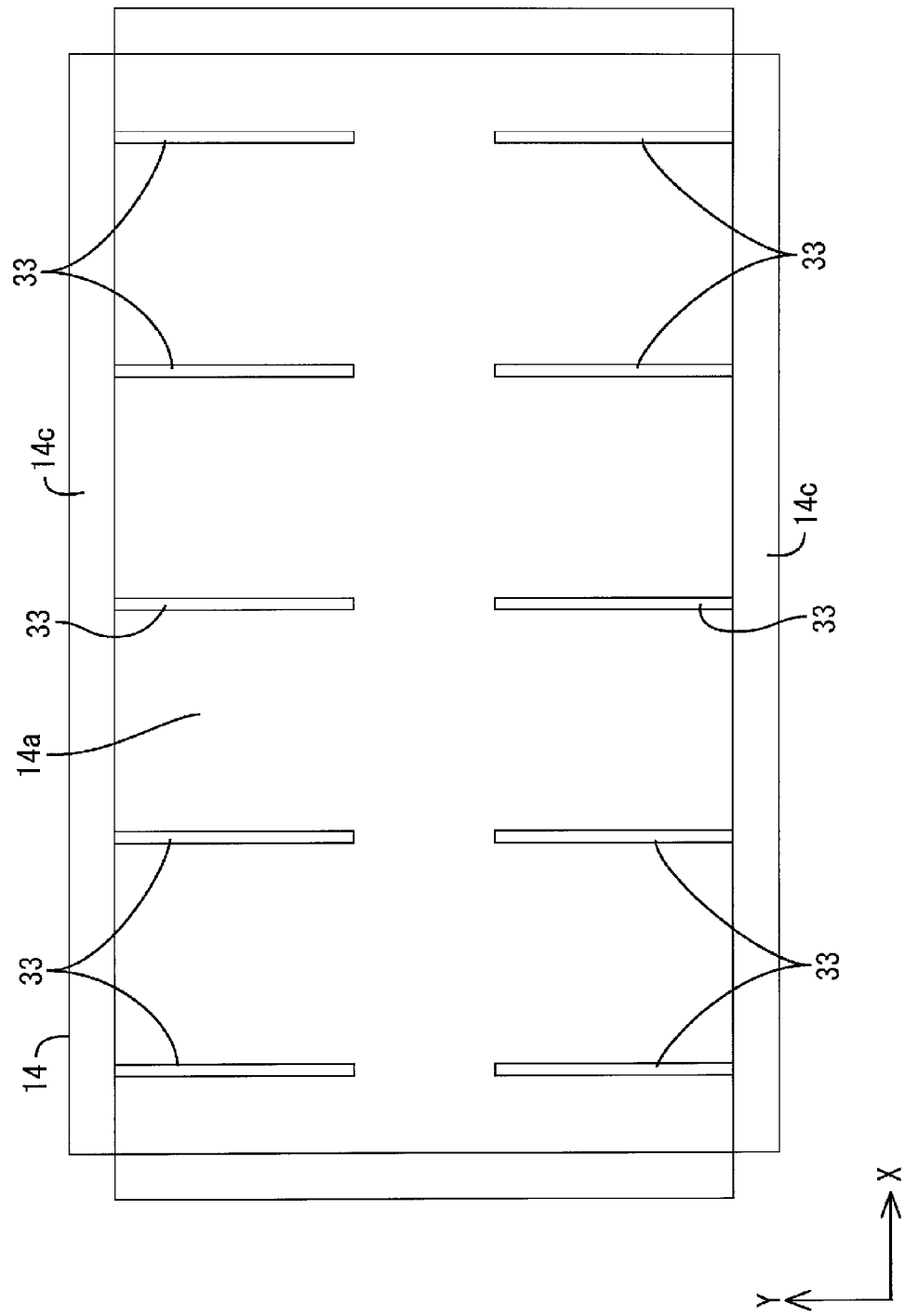
FIG. 5 is a plan view of a chassis included in the liquid crystal display device.
Figure 6:
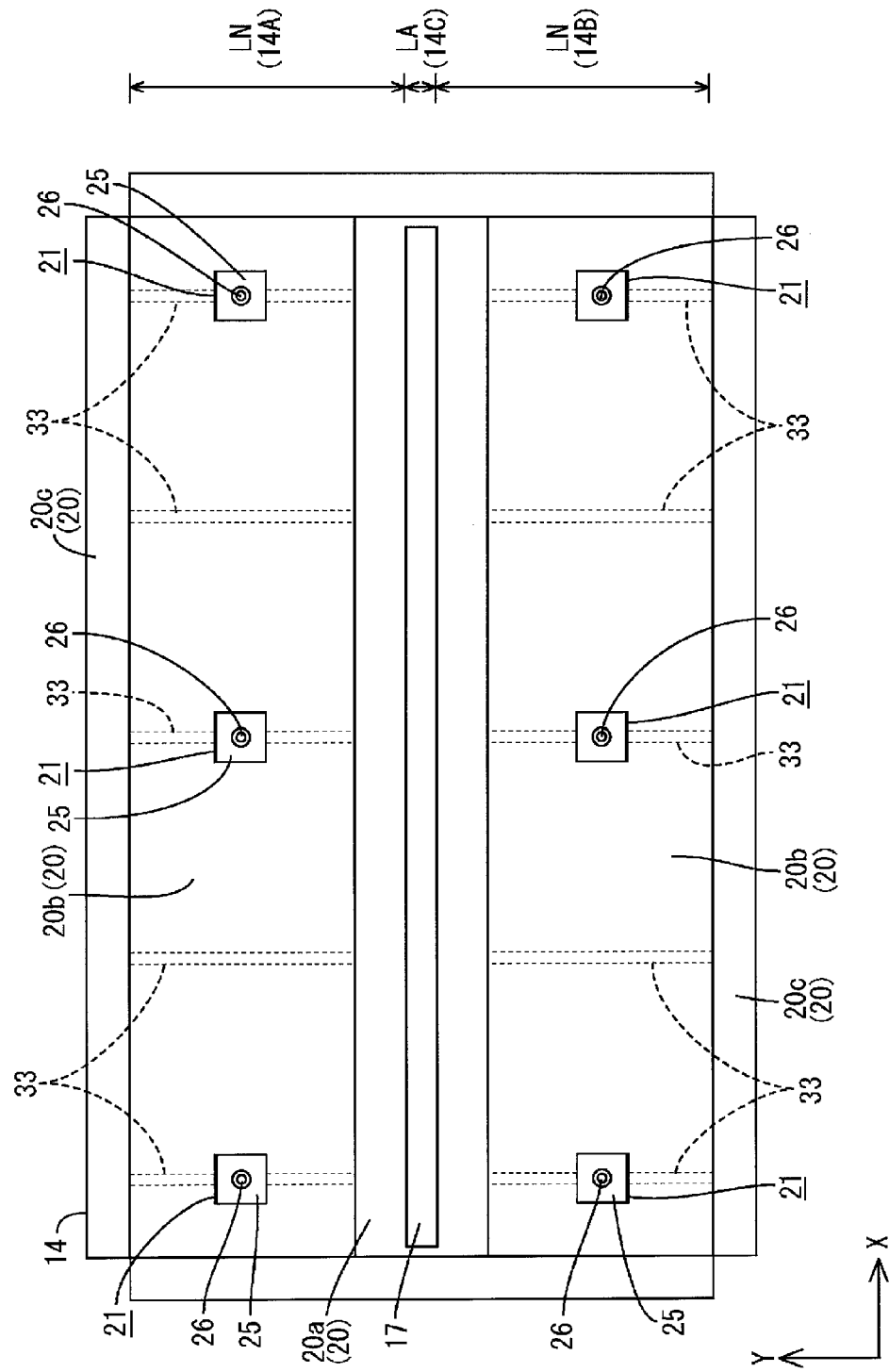
FIG. 6 is a plan view illustrating a configuration for arranging a hot cathode tube and support members in the chassis included in the liquid crystal display device.
Figure 7:
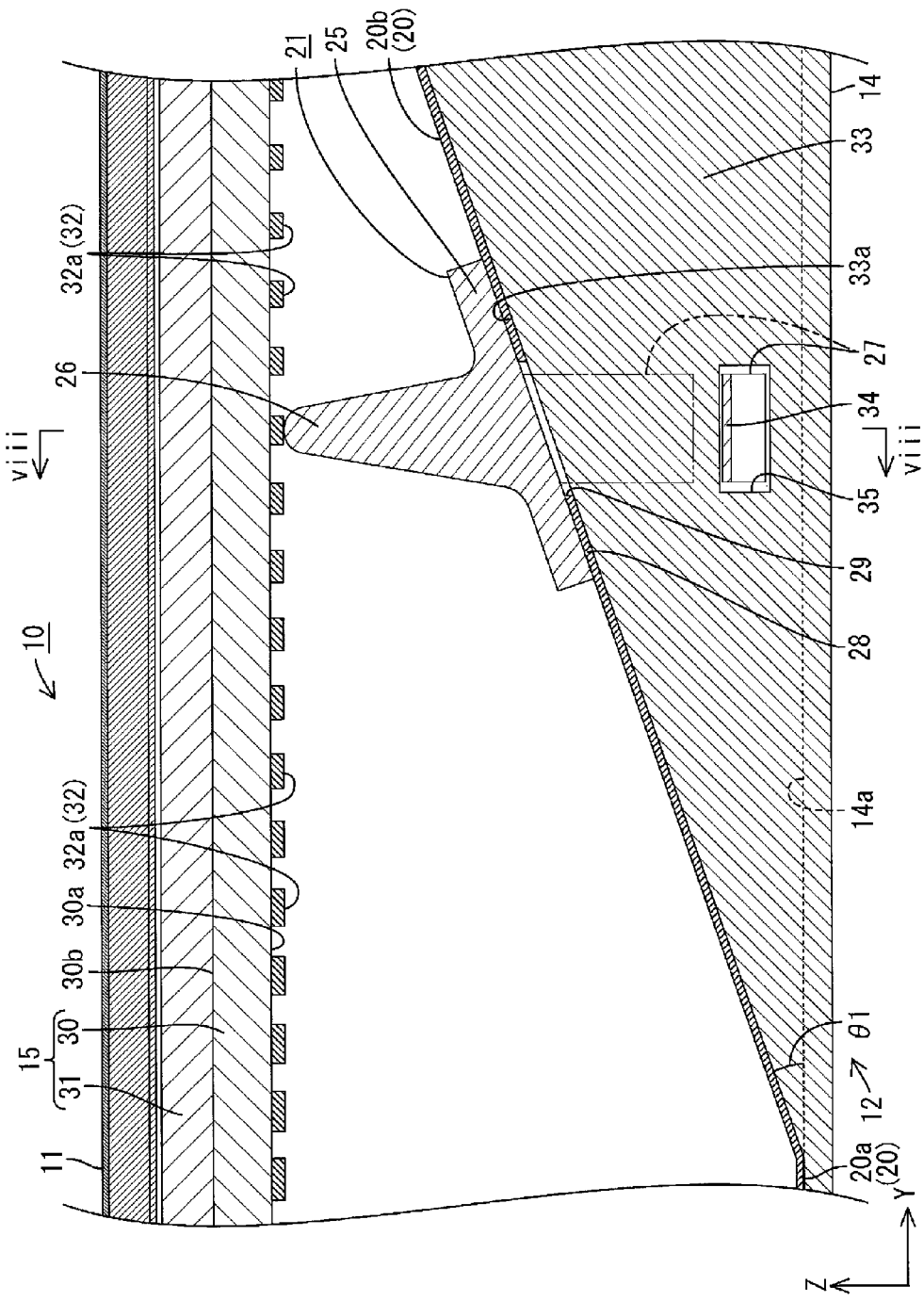
FIG. 7 is an enlarged cross-sectional view illustrating a part of FIG. 3.
Figure 8:
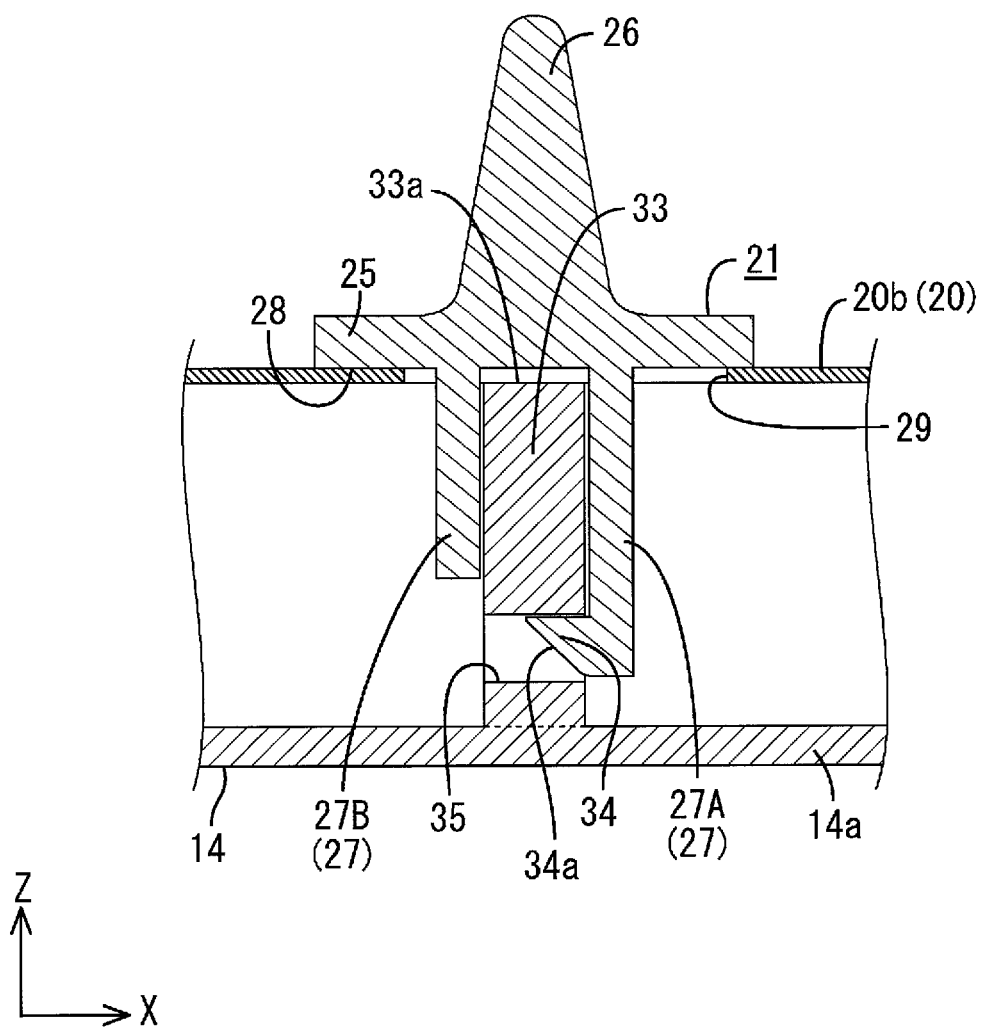
FIG. 8 is a cross-sectional view taken along the line viii-viii of FIG. 7.
Figure 9:
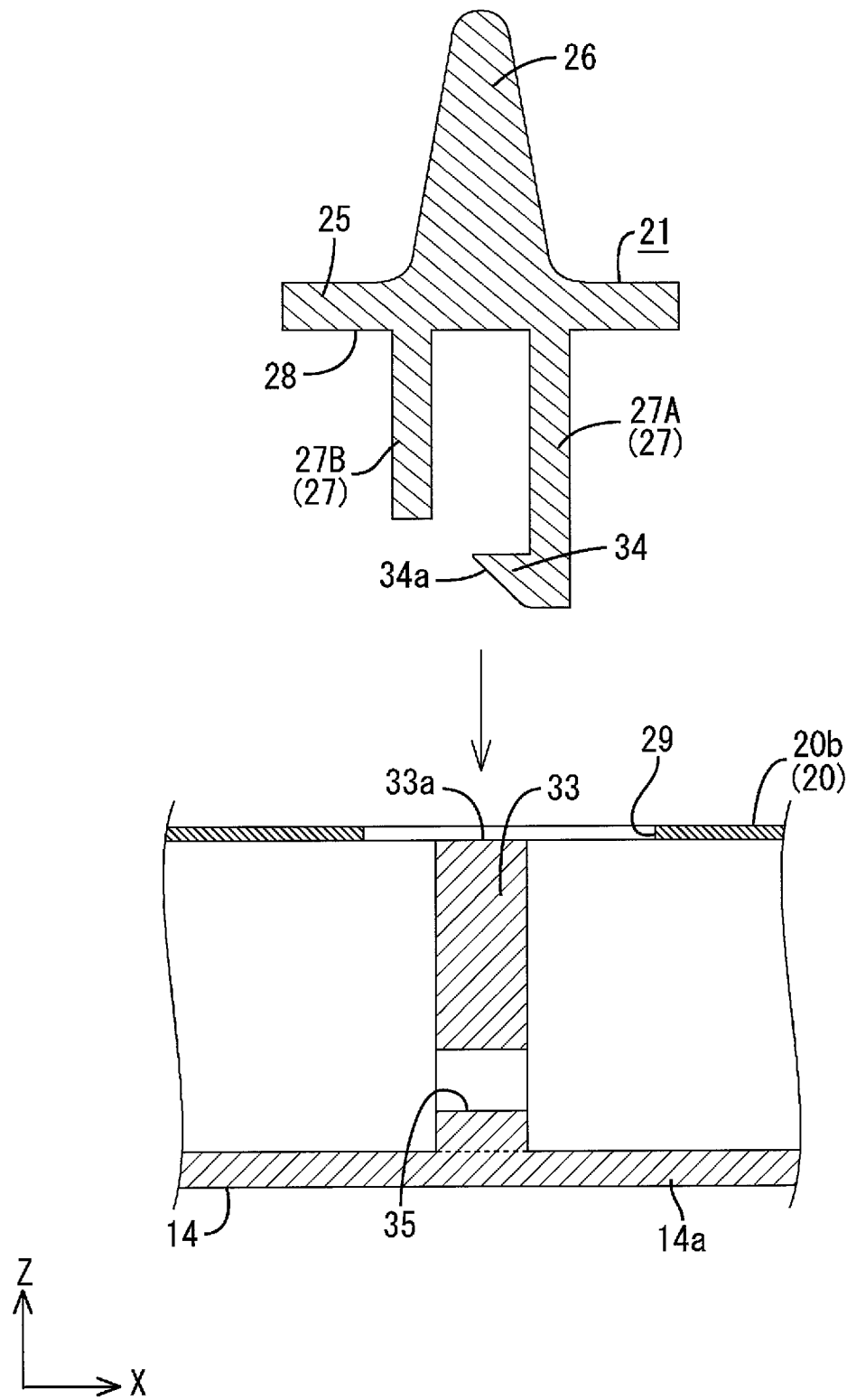
FIG. 9 is a cross-sectional view, taken along the line viii-viii of FIG. 7, illustrating a state before attachment of the support member.

FIG. 1 is an exploded perspective view illustrating a schematic configuration of a television receiver of this embodiment; FIG. 2 is an exploded perspective view illustrating a schematic configuration of a liquid crystal display device included in the television receiver in FIG. 1; FIG. 3 is a cross-sectional view illustrating a sectional configuration taken along a direction along the short sides of the liquid crystal display device in FIG. 2; FIG. 4 is a cross-sectional view illustrating a sectional configuration taken along a direction along the long sides of the liquid crystal display device in FIG. 2; FIG. 5 is a plan view of a chassis included in the liquid crystal display device in FIG. 2; FIG. 6 is a plan view illustrating a configuration for arranging a hot cathode tube and support members in the chassis included in the liquid crystal display device in FIG. 2; FIG. 7 is an enlarged cross-sectional view illustrating a part of FIG. 3; FIG. 8 is a cross-sectional view taken along the line viii-viii of FIG. 7; and FIG. 9 is a cross-sectional view, taken along the line viii-viii of FIG. 7, illustrating a state before the support member is attached. Note that FIGS. 5 and 6 assume that the X-axis direction represents a direction along the long sides of the chassis, and that the Y-axis direction represents a direction along the short sides thereof.

The television receiver TV according to the embodiment is configured to include the liquid crystal display device 10; front and back cabinets Ca and Cb sandwiching and storing the liquid crystal display device 10; a power source P; a tuner T; and a stand S, as shown in FIG. 1. The liquid crystal display device 10 (a display device) as a whole has a horizontally-long quadrangular shape (a rectangular shape; a longitudinal shape), and is housed in a vertical state. As shown in FIG. 2, this liquid crystal display device 10 includes: a liquid crystal panel 11 which is a display panel; and a backlight unit (a lighting device) 12 which is an external light source. The liquid crystal display device 10 is configured such that these components are integrally held by means of a frame-like bezel 13 and the like. This embodiment shows, as an example, the liquid crystal display device 10 having a screen size of 32 inches and an aspect ratio of 16:9, more specifically, a screen with a horizontal size (a size in the X-axis direction) of, for example, about 698 mm, and a vertical size (a size in the Y-axis direction) of, for example, about 392 mm.

Next, the liquid crystal panel 11 and the backlight unit 12 constituting the liquid crystal display device 10 will be described (refer to FIGS. 2 to 4).

The liquid crystal panel (display panel) 11 is configured such that a pair of glass substrates is attached together with a predetermined gap therebetween and liquid crystal is encapsulated between the glass substrates. One of the glass substrates has a switching component (TFT, for example) connected to a source wiring and a gate wiring orthogonal to each other, pixel electrodes connected to the switching component, an alignment film, and the like. The other glass substrate has color filters in which color sections of R (red), G (green), B (blue), and the like are arranged in predetermined alignment, counter electrodes, an alignment film, and the like. Note that, as shown in FIG. 3, polarizing plates 11a and 11b are arranged on the outer sides of the two substrates (refer to FIGS. 3 and 4).

As shown in FIG. 2, the backlight unit 12 includes: a chassis 14, which has an opening 14e in a frontward side (a light emitting side; one side facing toward the liquid crystal panel 11) of the backlight unit and has a substantially boxlike shape; a group of optical members 15 (a diffuser plate (a light diffusion member) 30, and two or more optical sheets 31 arranged between the diffuser plate 30 and the liquid crystal panel 11) arranged in a manner covering the opening 14e of the chassis 14; and frames 16 each arranged along a corresponding one of the long sides of the chassis 14, and supporting a long-side edge portion of the group of optical members 15 sandwiched between the chassis 14 and the frame 16. Further, the chassis 14 is internally provided with: a hot cathode tube 17, which is a light source (linear light source); sockets 18 carrying the function of relaying electrical connection in end portions of the hot cathode tube 17; and holders 19 each collectively covering an end portion of either of the hot cathode tubes 17 and the socket 18 corresponding thereto. In addition, while a reflection sheet 20, which reflects light, is laid down in the inside of the chassis 14, the chassis 14 is internally provided with support members 21 configured to support the optical members 15 from a backward side (one side facing the hot cathode tube 17) of the backlight unit. Note that, in the backlight unit 12, the light emitting side represents one side, with respect to the hot cathode tube 17, that faces toward the optical members 15.

The chassis 14 is made of synthetic resin, and, as shown in FIGS. 3 and 4, composed of: a bottom panel 14a; side panels 14b standing up frontward from end portions of the bottom panel 14a along the respective sides thereof; receiving panels 14c overhanging outward from rising end portions of the side panels 14b. Thus, the chassis 14 as a whole has a shallow, substantially boxlike shape. The bottom panel 14a has a rectangular shape (a longitudinal shape), the short and long sides of which follow the same directions as those of the liquid crystal panel 11 and the optical members 15. The bottom panel 14a is formed across a range, the size of which is substantially as large as those of the liquid crystal panel 11 and the optical members 15 in a plan view. Further, insertion holes through which to insert the sockets 18 are formed by drilling in both end portions of the bottom panel 14a in the direction along the long sides thereof. The side panels 14b are provided in pairs in end portions of the bottom panel 14a along the long sides thereof and along the short sides thereof, respectively, and angles at which the side panels 14b stand up from the bottom panel 14a are set at substantially right angles. The receiving panels 14c are formed from the respective side panels 14b, and have forms parallel to the bottom panel 14a since the receiving panels 14c are bent from the side panels 14b at substantially right angles. The receiving panels 14c are configured to have outer marginal portions of the reflection sheet 20 and the optical members 15 mounted thereon, and are thus enabled to receive the reflection sheet 20 and the optical members 15 from the backward side. Further, fixing holes 14d are formed in the receiving panels 14c by drilling as shown in FIG. 3, whereby it is possible to integrate the bezel 13, the frames 16, the chassis 14 and the like with one another by screws.

The reflection sheet 20 is made of synthetic resin (e.g., foamed PET), and has an appearance of a white color which provides excellent light reflectance. As shown in FIG. 2, the reflection sheet 20 is arranged on the inward surface (a surface facing the hot cathode tube 17) of the chassis 14, and is laid down in a manner covering almost all over this surface. The reflection sheet 20 allows light emitted from the hot cathode tube 17 to be reflected toward the optical member 15. The reflection sheet 20 as a whole has a rectangular shape (a longitudinal shape) having the long sides and short sides oriented in the same directions as the long sides and short sides of the chassis 14, and has a shape symmetrical along a direction along the short sides thereof. The reflection sheet 20 is composed of: a bottom portion 20a arranged along the bottom panel 14a of the chassis 14; a pair of rising portions 20b rising from end portions of the bottom portion 20a toward the frontward side (light emitting side); and a pair of outward-extending portions 20c extending outward from rising end portion (end portions facing away from the bottom portion 20a) of the respective rising portions 20b. The bottom portion 20a and the pair of rising portions 20b of the reflection sheet 20 have a size in a plan view set substantially equal to the bottom panel 14a of the chassis 14, and are arranged so as to overlap with the bottom panel 14a in a plan view as shown in FIGS. 3 and 6. In other words, the bottom panel 14a of the chassis is formed across a range covering all over the region corresponding to the bottom portion 20a and the pair of rising portions 20b in the reflection sheet 20 in a plan view. Thus, it can be acknowledged that the bottom panel 14a is formed across a wider range than in a case where the bottom panel of the chassis is formed in a range overlapping only with the bottom portion 20a. This bottom panel 14a thus formed across the sufficiently wide range can be utilized to mount components such as an inverter board 22 on the backward side of the bottom panel 14a or to attach thereon a wall-hanging attachment (not shown) used for hanging the liquid crystal display device 10 on a wall.

Specifically, the bottom portion 20a is arranged in the middle portion (a position overlapping with a middle portion 14C) of the bottom panel 14a of the chassis 14 in a direction along the short sides thereof in a plan view, and has a form parallel to the plate surfaces of the bottom panel 14a. The bottom portion 20a has a rectangular shape (a longitudinal shape), and, while a direction along the long sides thereof agrees with the X-axis direction (the direction along the long sides of the chassis 14; the axial direction of the hot cathode tube 17), a direction along the short sides thereof agrees with the Y-axis direction (the direction along the short sides of the chassis 14). The size of the long sides of the bottom portion 20a is set substantially equal to the size of the long sides of the bottom panel 14a of the chassis 14, whereas the size of the short sides of the bottom portion 20a is set smaller than the size of the short sides of the bottom panel 14a and the short side of the bottom portion 20a occupies, for example, about 3 to 87% of the short side of the bottom panel 14a. That is, the bottom portion 20a is formed smaller than the bottom panel 14a of the chassis 14 only in the direction along the short sides. Additionally, the bottom portion 20a is arranged in the backward side (one side opposite to the light emitting side) with respect to the hot cathode tube 17, and interposed between the bottom panel 14a and the hot cathode tube 17.

As shown in FIGS. 3 and 7, the rising portions 20b are arranged in a pair bottom portion 20a so as to sandwich the bottom portion 20a therebetween in the short-side direction of the bottom portion 20a. At the same time, the rising portions 20b are arranged in positions (positions overlapping with opposite end portions 14A and 14B) corresponding to opposite end portions in the bottom panel 14a of the chassis 14 in the direction along the short sides thereof in a plan view. That is, each of the rising portions 20b rising in opposite directions, from opposite end portions extending along the long sides of the bottom portion 20a. Each of the rising portion 20b has a sloping shape having a constant slope from a rising base end portion (an end portion facing toward the bottom portion 20a) to a rising top end portion (an end portion facing away from the bottom portion 20a (an end portion close to the outward-extending portion 20c)). In the rising portion 20b, the plate surfaces slope with respect to both the Y-axis direction and the Z-axis direction, that is, with respect to the plate surfaces of the bottom portion 20a. An angle θ1 (an angle of slope to the plate surfaces of the bottom portion 20a; an angle formed with the Y-axis direction) at which the rising portion 20b stands up from the bottom portion 20a is preferably set to an acute angle (an angle not exceeding 90 degrees), more preferably set to an angle not exceeding 45 degrees, and, specifically, set to, for example, about 20 to 30 degrees.

In the reflection sheet 20, the bottom portion 20a extends along the inward surface of the bottom panel 14a of the chassis 14 substantially with no gap held between the bottom portion 20a and the bottom panel 14a, whereas the rising portion 20b assumes a form standing up while going farther away from the bottom panel 14a. Therefore, a gap is held between the rising portion 20b and the bottom panel 14a (FIG. 8), and the gap becomes larger as the rising portion 20b approaches the rising top end portion from the rising bottom portion. That is, the rising portion 20b is set in a state floating frontward with a gap between the rising portion 20b and the bottom panel 14a. This gap has a substantially triangular shape in a side view (FIG. 3). As shown in FIG. 6, the rising portion 20b has, a rectangular shape (a longitudinal shape) in a plan view, and the long sides and short sides thereof are oriented in the same directions as those of the bottom portion 20a. The size of the long sides of the rising portion 20b is set substantially equal to the size of the long sides of the bottom panel 14a of the chassis 14, whereas the size of the short sides of the rising portion 20b is set smaller than the bottom panel 14a, and set to, for example, about 6.5 to 48.5% of, the size of the short sides of the bottom panel 14. That is, the rising portions 20b are formed smaller than the bottom panel 14a of the chassis 14 only in the direction along the short sides. The area (the size of the short sides) of the rising portion 20b is set larger than the area (the size of the short sides) of the bottom portion 20a.

The outward-extending portions 20c extend outward from the rising top end portions of the respective rising portions 20b, and are arranged so as to overlap with the respective receiving panels 14c of the chassis 14 in a plan view. The outward-extending portions 20c have forms parallel to the plate surfaces of the bottom portion 20a (the bottom panel 14a and the receiving panels 14c), and are mounted on the frontward surfaces of the respective receiving panels 14c. Each of the outward-extending portions 20c is interposed and held between a corresponding one of the receiving panels 14c and an outer marginal portion of the diffuser plate 30.

Incidentally, as shown in FIGS. 3 and 7, the chassis 14 is integrally provided with receiving portions 33 enabled to receive, from the backward side (the side opposite to the light emitting side), parts of the rising portions 20b in the reflection sheet 20 which are set in a state floating from the bottom panel 14a. As shown in FIGS. 3 and 5, each of the receiving portions 33 has a wall-like shape (plate-like shape) standing up frontward (toward the light exit side) from the bottom panel 14a, and a surface plane of the main wall surface (the main plate surface) thereof agrees with the Y-axis direction. In other words, the receiving portion 33 has a rib-like shape extending along the Y-axis direction. As shown in FIG. 6, the receiving portions 33 are arranged in positions (light-source non-arrangement areas LN to be described below) that are in opposite end portions in the bottom panel 14a in a direction along the short sides thereof and that overlap with the rising portions 20b in a plan view. The five receiving portions 33 are arranged side by side along the X-axis direction in positions spaced apart from one another, and arrayed at substantially equal pitches. The receiving portion 33 that is located at the center of all the receiving portions 33 along the X-axis direction is arranged at the central position of the chassis 14 in the direction along the long sides thereof. As shown in FIGS. 3 and 7, the cross-section of each of the receiving portions 33 cut along the Y-axis direction has a substantially triangular shape, which is a shape corresponding to a space surrounded by the sloping rising portion 20b, the bottom panel 14a and the side panel 14b. In the receiving portion 33, a frontward surface (a surface facing the rising portion 20b) has a shape sloping with respect to both the bottom panel 14a and the side panel 14b (the Y-axis direction and the Z-axis direction), and the frontward surface here is provided as a receiving surface 33a for a corresponding one of the rising portions 20b. The receiving surface 33a has a form extending along (parallel to) the rising portion 20b. An angle (an angle of slope) that the receiving surface 33a forms with the bottom panel 14a (the Y-axis direction) is set substantially equal to the above described angle θ1 (an acute angle not exceeding 45 degrees) at which the rising portion 20b stands up from the bottom portion 20a. This provides a setting where almost no gap is held between the receiving surface 33a of the receiving portion 33 and the rising portion 20b. Note that, as described above, a gap is held between each of parts of the rising portion 20b and the bottom panel 14a, the parts not overlapping with the receiving portions 33 in a plan view. Each of the receiving portions 33 has a form continuing into both the bottom panel 14a and the inward surface of either of the side panels 14b, whereby the strength of the chassis 14 is improved.

The optical members 15 have a laterally-elongated quadrangular shape (a rectangular shape) in a plan view like the liquid crystal panel 11 and the chassis 14 as shown in FIG. 2. The optical member 15 intervenes between the liquid crystal panel 11 and the hot cathode tube 17, and is formed by the diffuser plate 30 disposed on the backward side (the hot cathode tube 17 side and opposite to the light emitting side) and an optical sheet 31 disposed on the frontward side (the liquid crystal panel 11 side and the light emitting side). The diffuser plate 30 has a configuration obtained by dispersing a large number of diffusing particles in a substantially transparent base substrate made of resin matrix and having a predetermined thickness, and not only has the function of diffusing light passing therethrough but also, as described in detail below, has the light reflecting function of reflecting light emitted by the hot cathode tube 17. The optical sheets 31 have a sheet-like shape having a plate thickness thinner than that of the diffuser plate 30, and has three layers arranged by being laminated together. Specifically, the optical sheets 31 have a diffuser sheet, a lens sheet, and a reflection type polarizing sheet in order from the diffuser plate 30 (from the backward side).

As shown in FIGS. 3 and 4, the hot cathode tube 17 as a whole has a tubular (linear) shape, and includes a hollow glass tube 17a and a pair of electrodes 17b arranged in both end portions of the glass tube 17a. While mercury, rare gas and the like are enclosed in the inside of the glass tube 17a, the inward wall surface thereof has a fluorescent material applied thereto. Each of the electrodes 17b includes a filament and a pair of terminals connected to both end portions of the filament. The sockets 18 are set fitting in with the respective end portions of the hot cathode tube 17 from outside, and the terminals are connected via these sockets 18 to the inverter board 22 attached to the outward surface (the backward surface) of the bottom panel 14a of the chassis 14. The hot cathode tube 17 is supplied with drive power from the inverter board 22, and is configured to control a tube current value, that is, brightness (lighting status) by the inverter board 22. The hot cathode tube 17 is interposed between the diffuser plate 30 and the bottom panel 14a (the reflection sheet 20) of the chassis 14, and is arranged in a position that is nearer to the bottom panel 14a of the chassis 14 than to the diffuser plate 30. Note that the size of the outer diameter of the hot cathode tube 17 is larger than the size (e.g., about 4 mm) of the outer diameter of the cold cathode tube, and set to, for example, about 15.5 mm.

The hot cathode tube 17 having the above structure is arranged, as only one hot cathode tube, inside the chassis 14 with the lengthwise direction (the axial direction) thereof agreeing with the direction along the long sides of the chassis 14 as shown in FIG. 6. Besides, the hot cathode tube 17 is positioned substantially at the center of the chassis 14 in the direction along the short sides thereof. Specifically, when the bottom panel 14a (a part facing the optical members 15 and the hot cathode tube 17) of the chassis 14 is divided, in the direction (the Y-axis direction) parallel to the short sides thereof, into the first end portion 14A, the second end portion 14B located in an end portion opposite to the first end portion 14A, and the middle portion 14C sandwiched between these end portions, the hot cathode tube 17 is arranged in the middle portion 14C. Thus, the light-source arrangement area LA is formed therein. On the other hand, the hot cathode tube 17 is not arranged in the first end 14A and the second end portion 14B of the bottom panel 14a. Thus, the light-source non-arrangement areas LN are formed therein. That is, the hot cathode tube 17 forms the light-source arrangement area LA in a manner unevenly distributed and existing only in the middle portion 14C of the bottom panel 14a of the chassis 14 in the direction along the short sides thereof, and the area (the length in the Y-axis direction) of the light-source arrangement area LA is smaller than the area (the length in the Y-axis direction) of each light-source non-arrangement area LN.

Further, the percentage of the area (the length of the Y-axis direction) of the light-source arrangement area LA with respect to the area (the vertical size (the size of the short sides) of the screen) of the whole screen is set to, for example, about 4%. Additionally, the respective light-source non-arrangement areas LN provided in a pair have areas set substantially equal to each other.

The middle portion 14C (the light-source arrangement area LA) in the chassis 14 is overlapped by a part (specifically, the central portion in the direction along the short sides) of the bottom portion 20a in the reflection sheet 20 in a plan view, whereas the first end portion 14A and the second end portion 14B (the light-source non-arrangement areas LN) are overlapped by parts (specifically, the end portions in the direction along the short sides) of the bottom portion 20a and the respective rising portions 20b in the reflection sheet 20 in a plan view. That is, while the main part of the bottom portion 20a is arranged in the light-source arrangement area LA, parts of the respective opposite end portions of the bottom portion 20a and the whole areas of the respective rising portions 20b are arranged in the light-source non-arrangement areas LN. Besides, the above described receiving portions 33 are provided within both of the light-source non-arrangement areas LN in the bottom panel 14a. The receiving portions 33 are arranged in positions, within the two light-source non-arrangement areas LN, that do not overlap with the bottom portion 20a in a plan view but overlap with the two rising portions 20b in a plan view. Additionally, the hot cathode tube 17 is formed so that the length thereof may be substantially equal to the horizontal size (the size of the long sides) of the screen.

The respective holders 19 covering the end portions of the hot cathode tube 17 and the sockets 18 are made of synthetic resin that appears in a white color, and have long and narrow, substantially boxlike shapes extending along the direction along the short sides of the chassis 14 as shown in FIG. 2. As shown in FIG. 4, each of the holders 19 has, in the frontward side thereof, a stepped surface enabled to have the optical members 15 and the liquid crystal panel 11 mounted on different steps thereof, and is arranged in a state partially overlapping with either of the receiving panels 14c that extend along the direction along the short sides of the chassis 14. Thus, the holder 19 and the receiving panel 14c together form a sidewall of the backlight unit 12. Insertion pins 23 are projecting from surfaces of the respective holders 19 that face toward the receiving panels 14c of the chassis 14, and the holders 19 are attached to the chassis 14 by having the insertion pins 23 inserted into insertion holes 24 formed in the upper surfaces of the receiving panels 14c of the chassis 14.

The support members 21 are made of synthetic resin (e.g., made of polycarbonate), and configured such that the entire surfaces thereof appear in a whitish color, such as white, which is excellent in light reflectance. As shown in FIG. 2, these support members 21 are arranged in positions (within the light-source non-arrangement areas LN) inside the chassis 14 that overlap with the rising portions 20b of the reflection sheet 20 in a plan view. The support members 21 not only have the function of supporting the optical members 15 from the backward side (the side opposite to the light emitting side) but also have the function of pressing the rising portions 20b in the reflection sheet 20 from the frontward side (the light emitting side).

Specifically, as shown in FIG. 6, the six support members 21 in total are arranged inside the chassis 14 while being spaced apart from one another in parallel to each other in the following manner. The two support members 21 in each of pairs formed by these six support members 21 are placed in the respective opposite end portions, not in the middle portion, along the direction along the short sides of the chassis 14; and the three support members 21 in each of groups formed by these six support members 21 are placed in the substantially middle position and in positions in the vicinities of the opposite end portions, respectively, along the direction along the long sides thereof. The support members 21 are arranged within the light-source non-arrangement areas LN in the bottom panel 14a, and are placed so as to overlap with the rising portions 20b of the reflection sheet 20 in a plan view. Further, the support members 21 are arranged in positions, within the light-source non-arrangement areas LN, that overlap with the receiving portions 33 in a plan view. The support members 21 are placed so as to overlap with the receiving portions 33 that are arranged in the central position and the positions at both ends of all the receiving portions 33 in the direction along the long sides of the chassis 14 in a plan view, and are configured to be attachable directly to these receiving portions 33 that are overlapped by the support members 21. Additionally, the support members 21 are arranged in the substantially central positions of the receiving portions 33 in the Y-axis direction (a direction in which the receiving surfaces 33a extend). The relations of the support members 21 with the rising portions 20b of the reflection sheet 20 and with the receiving portions 33 of the chassis 14 will be described below in detail in conjunction with the structure of each of the support members 21.

As shown in FIGS. 7 and 8, the support member 21 includes: a support portion 26 configured to support the optical members 15 from the backward side; a pressing portion 25 having a pressing surface 28 configured to press the reflection sheet 21 from the frontward side; and a pair of attachment pieces 27 configured to be attachable to a corresponding one of the receiving portions 33 of the chassis 14.

The support portion 26 projects frontward from the frontward surface (a surface opposite to the pressing surface 28) of the pressing portion 25, and the axis thereof crosses (passes through) a space (a space held between the diffuser plate 30 and the reflection sheet 20) inside the chassis 14. The axial direction of the support portion 26 agrees with the Z-axis direction (a direction substantially orthogonal to the plate surfaces of the optical members 15). Thus, the axis of the support portion 26 forms right angles with the plate surfaces of the diffuser plate 30. The support portion 26 has a conical shape, and specifically is tapered so that, while the cross-sectional shapes thereof taken along the X-axis direction and along the Y-axis direction may be circular, the diameter thereof may gradually narrow from the projection base end to the projection top end thereof. The size of the projection in the support portion 26 is substantially equal to a distance from the frontward surface of the pressing portion 25 to the backward surface of the diffuser plate 30 under the condition that the diffuser plate 30 is set substantially straight along the X-axis direction and along the Y-axis direction. Thus, this support portion 26 is configured to abut the diffuser plate 30 under the condition that the diffuser plate 30 is thus set substantially straight. In this support portion 26, the projection top end, which is a position that abuts the diffuser plate 30, is rounded. It can be acknowledged that this support portion 26 has a point-like shape within a surface of the optical members 15.

Thus supporting the optical members 15 from the backward side by using these support portions 26 makes it possible to regulate, at a constant level, a positional relation (a distance; an interval) between each of the optical members 15 (the diffuser plate 30 in particular) and the hot cathode tube 17 in the Z-axis direction (a direction orthogonal to the plate surfaces of the optical members 15). The optical members 15 are thereby enabled to stably perform desired optical functions.

The pressing portion 25 has a rectangular plate-like shape in a plan view (FIG. 6), and the backward surface out of the plate surfaces thereof is used as the pressing surface 28 placed against either of the rising portions 20b of the reflection sheet 20. Additionally, this pressing surface 28 has a form sloping with respect to both the Y-axis direction (a direction orthogonal to the axial direction of the support portion 26) and the Z-axis direction (the axial direction of the support portion 26). An angle (an angle of slope) that the pressing surface 28 forms with the Y-axis direction is substantially equal to the angle θ1 (an acute angle not exceeding 45 degrees) at which the rising portion 20b stands up from the bottom portion 20a, and the angle that the receiving surface 33a of the receiving portion 33 forms with the Y-axis direction. Thus, when the support member 21 is attached to the receiving portion 33, the rising portion 20b, the receiving surface 33a and the pressing surface 28 become substantially parallel to one another, and are brought into a state where there is almost no gap held between these components. That is, by being pressed from the frontward side by the pressing surface 28 of the pressing portion 25 while being received from the backward side by the receiving surface 33a of the receiving portion 33, the rising portion 20b is kept unlikely to be displaced either frontward or backward. Not only that, the pressing portion 25 is arranged in a position overlapping with the receiving portion 33 in a plan view. This makes it possible for the rising portion 20b to be held and interposed between the pressing surface 28 of the pressing portion 25 and the receiving surface 33a of the receiving portion 33, whereby the shape of the rising portion 20b can be still more stably maintained. The size of the pressing portion 25 along the Y-axis direction is set smaller than the sizes of the receiving portion 33 and the rising portion 20b in the same direction. Thus, the pressing portion 25 is configured to press a part of the rising portion 20b along the Y-axis direction (a direction oriented from the bottom portion 20a toward the rising portion 20b). Additionally, the size of the pressing portion 25 along the X-axis direction (a direction along the plate thickness of the receiving portion 33) is set larger than the plate thickness of the receiving portion 33. Further, the frontward surface of the pressing portion 25 is substantially parallel to the pressing surface 28 that faces backward.

The pair of attachment pieces 27 is arranged, on the pressing surface 28 in the pressing portion 25, in positions spaced from each other with a predetermined distance therebetween along the X-axis direction (a direction along the plate thickness of the receiving portion 33), and have forms projecting backward from the pressing surface 28. Directions toward which these attachment pieces 27 project from the pressing portion 25 agree with the Z-axis direction, that is, the axial direction of the support portion 26. Further, these attachment pieces 27 have cantilevered shapes, and have forms parallel to each other. The receiving portion 33 is held between the two attachment pieces 27 aligned with each other in the X-axis direction, and this configuration makes it possible to attach the support member 21 to the receiving portion 33. The distance between these attachment pieces 27 is set substantially equal to the plate thickness of the receiving portion 33. In a position that overlap with these attachment pieces 27 in a plan view, the rising portion 20b of the reflection sheet 20 has an insertion hole 29 through which the two attachment pieces 27 can be inserted. In the rising portion 27b, a predetermined range around the insertion hole 29 is configured to be pressed by the pressing surface 28 of the pressing portion 25.

One of the paired attachment pieces 27 and the receiving portion 33 have an engagement structure which enables engagement therebetween. Note that, in the following description, when the two attachment pieces 27 should be distinguished from each other on the basis of whether or not the attachment pieces 27 have the engagement structure, a term "first attachment piece" together with a suffix "A" appended to the reference sign thereof is used to represent one provided with the engagement structure, whereas a term "second attachment piece" together with a suffix "B" appended to the reference sign thereof is used to represent the other one not provided with the engagement structure. When there is no need to distinguish the attachment pieces 27, the suffixes are not particularly appended. The first attachment piece 27A includes an engagement projection 34 projecting toward the second attachment piece 27B (toward the receiving portion 33) along the X-axis direction. A length by which the first attachment piece 27A projects from the pressing portion 25 is set larger than a length by which the second attachment piece 27B projects therefrom, and the engagement projection 34 is arranged in the projection top-end portion of the first attachment piece 27A. In the engagement projection 34, a tapered guide surface 34a is provided on the fore-end surface of the first attachment piece 27A. On the other hand, the receiving portion 33 includes an engagement hole 35 configured to accept the engagement projection 34. The engagement hole 35 has a form penetrating the receiving portion 33 in a direction (the X-axis direction) along the plate thickness thereof, and is configured so as to enable engagement between the hole edge thereof and the engagement projection 35. Upon engagement of the engagement projection 34 with the hole edge of the engagement hole 35, the support member 21 is brought into a state unable to be displaced toward a direction that oriented away (a direction along which the support member 21 is detached) from the receiving portion 33 along the Z-axis direction, whereby the support member 21 is prevented from coming off the receiving portion 33. When the support member 21 is attached to or detached from the receiving portion 33, the first attachment portion 27A is allowed to elastically deform, and, along with this elastic deformation, is displaced in a direction (the X-axis direction) oriented toward or away from the second attachment piece 27B (the receiving portion 33). Note that, in attaching or detaching the support member 21, the second attachment portion 27B makes contact with and slides on a wall surface of the receiving portion 33, thereby being allowed to guide an action for the attachment or detachment.

Figure 10:
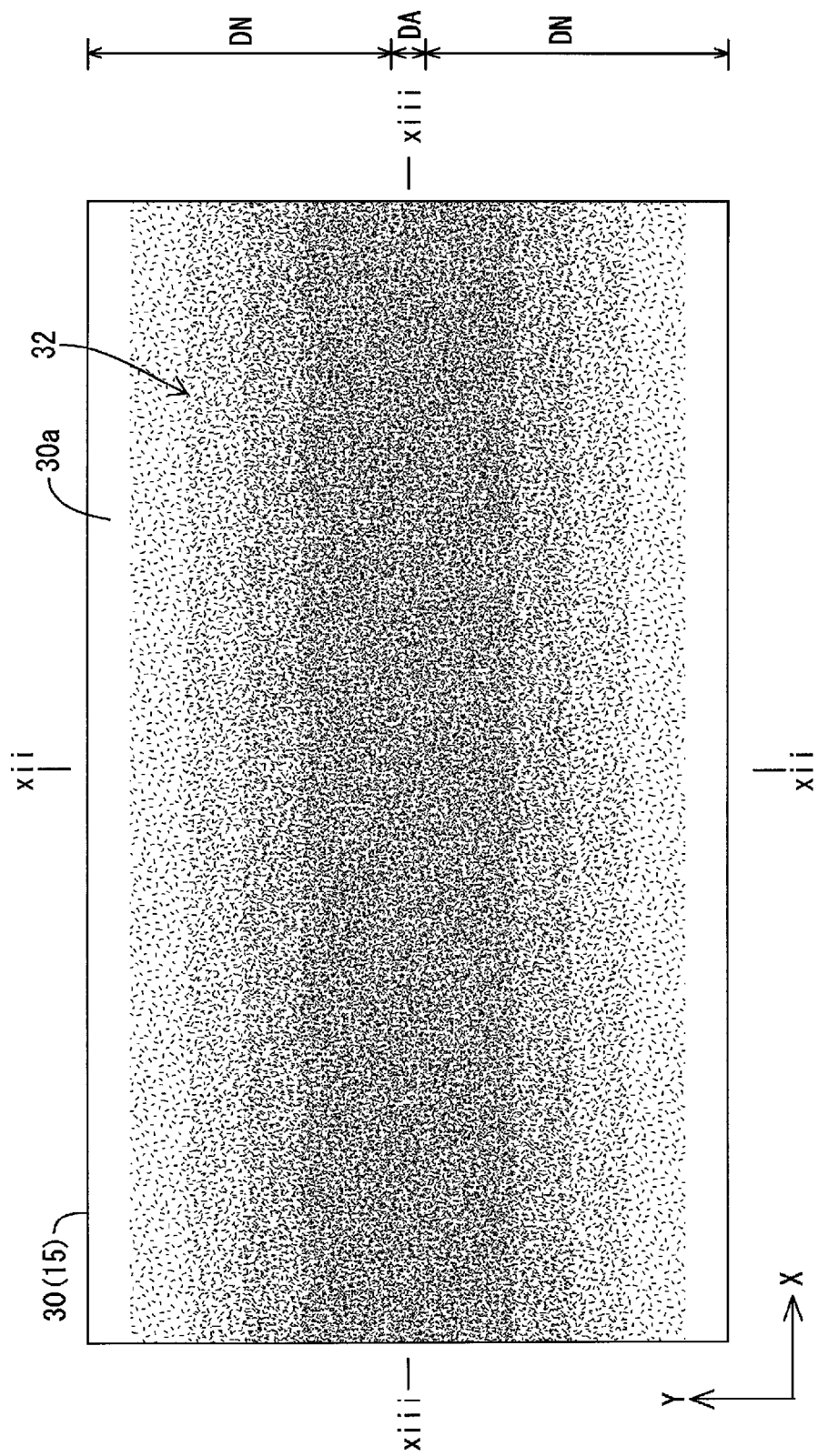
FIG. 10 is a plan view illustrating the distribution of light reflectance in a diffuser plate.
Figure 11:
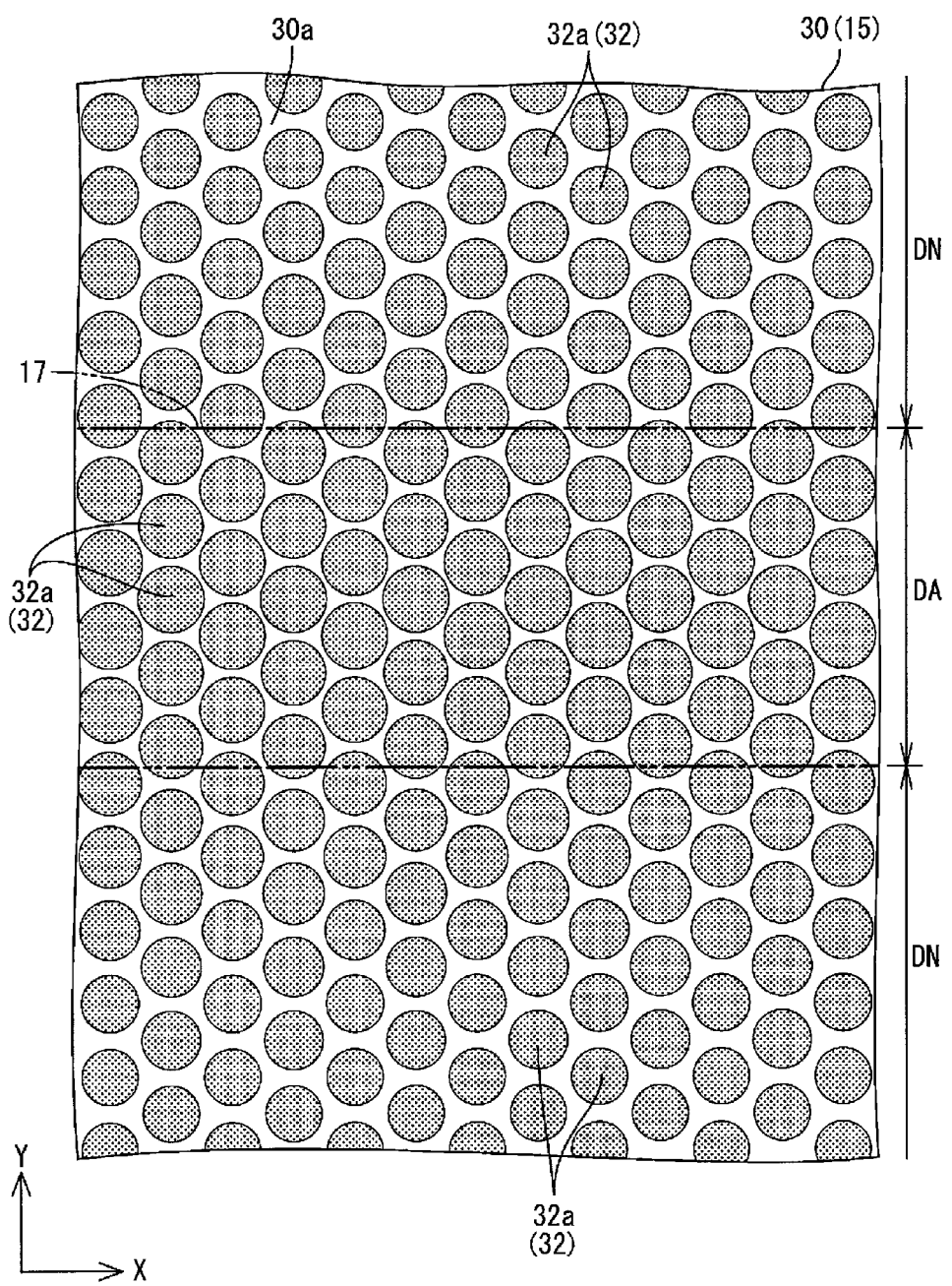
FIG. 11 is an enlarged plan view of a part illustrating a schematic configuration of a surface of the diffuser plate that faces the hot cathode tube.
Figure 12:
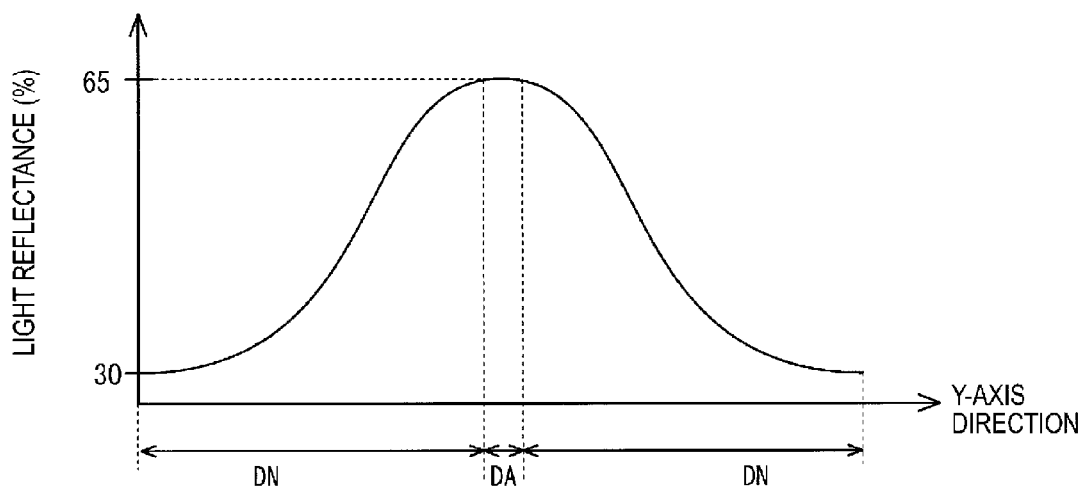
FIG. 12 is a graph illustrating changes in light reflectance along the line xii-xii shown in FIG. 10 in a direction along the short side of the diffuser plate.
Figure 13:
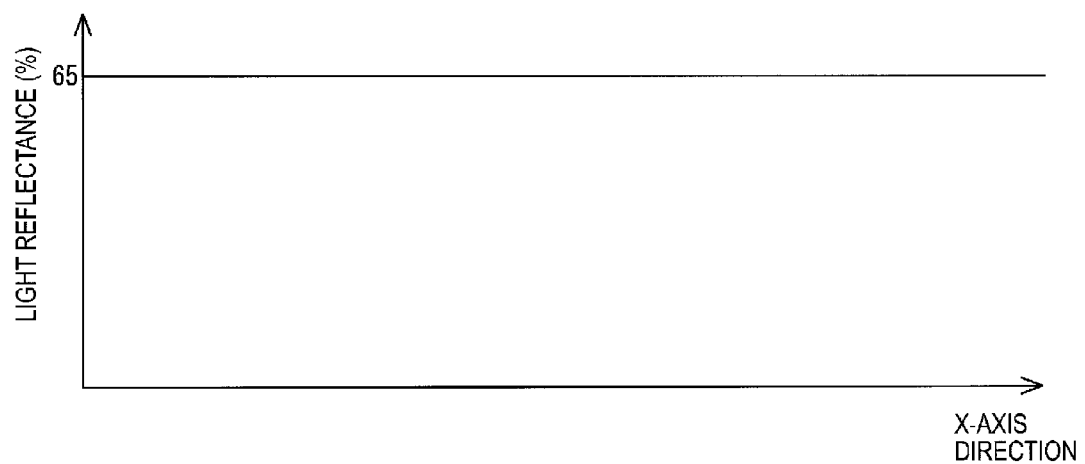
FIG. 13 is a graph illustrating changes in light reflectance along the line xiii-xiii shown in FIG. 10 in a direction along the long side of the diffuser plate.

Next, configurations regarding the light reflecting function that the diffuser plate 30 has will be described in detail. FIG. 10 is a plan view illustrating the distribution of light reflectance in the diffuser plate; FIG. 11 is an enlarged main-part plan view illustrating a schematic configuration of a surface of the diffuser plate of FIG. 10 that faces the hot cathode tube; FIG. 12 is a graph illustrating changes in light reflectance of the diffuser plate in FIG. 10 in a direction along the short sides thereof; and FIG. 13 is a graph illustrating changes in light reflectance of the diffuser plate in FIG. 10 in a direction along the long sides thereof. Note that, in FIG. 12, the direction along the long sides of the diffuser plate is set as the X-axis direction, and the direction along the short sides thereof is set as the Y-axis direction. Also, in FIG. 12, the horizontal axis represents the Y-axis direction (the direction along the short sides), and the graph shows plots of the light reflectance along the Y-axis direction from the lower end portion to the upper end portion in FIG. 10. Likewise, in FIG. 13, the horizontal axis represents the X-axis direction (the direction along the long sides), and the graph shows plots of the light reflectance along the Y-axis direction from the left end portion to the right end portion shown in FIG. 10.

The diffuser plate 30 is formed by dispersing and mixing a predetermined amount of diffusing particle diffusing light, into an almost transparent base substrate made of synthetic resin (polystyrene, for example), and has almost uniform light transmittance and light reflectance as a whole. Specifically, the light transmittance and light reflectance on the base substrate of the diffuser plate 30 (excluding a light reflecting portion 32 described later) are preferably about 70% and about 30%, respectively, for example. The diffuser plate 30 has a surface opposed to the hot cathode tube 17 (hereinafter, referred to as first plane 30a) and a surface located opposite to the first plane 30a and opposed to the liquid crystal panel 11 (hereinafter, referred to as second plane 30b). The first plane 30a is set as a light incident plane into which light from the hot cathode tube 17 is entered, whereas the second plane 30b is set as a light emitting plane from which light (illumination light) is output toward the liquid crystal panel 11.

Additionally, as shown in FIGS. 10 and 11, the light reflecting portion 32 formed into a dotted pattern appearing in a white color is formed on the first plane 30a, which constitutes the light-entering surface in the diffuser plate 30. The light reflecting portion 32 is formed by arranging a number of dots 32a in a zigzag manner (in a zigzag alignment; in a staggered manner), the plurality of dots 32a each having a circular shape in a plan view. The dot pattern of the light reflecting portion 32 is formed by printing a paste containing a metal oxide, for example, on the surface of the diffuser plate 30. The preferred means for the printing is screen printing, ink-jet printing, or the like. The light reflecting portion 32 has a light reflectance of about 75%, for example, which is larger as compared to in-plane light reflectance of about 30% of the diffuser plate 30. In the embodiment, the light reflectance of each material is an average light reflectance in a measurement diameter of the CM-3700d LAV (with a measurement diameter of φ25.4 mm) manufactured by Konica Minolta Holdings, Inc. In addition, the light reflectance on the light reflecting portion 32 is measured in a manner that the light reflecting portion 32 is formed on one entire surface of a glass substrate and the formation surface is measured by the foregoing measurement means.

The diffuser plate 30 has different characteristics along a direction (the X-axis direction) parallel to the long sides thereof and along a direction (the Y-axis direction) parallel to the short sides thereof. The diffuser plate 30 is configured such that, as shown in FIG. 12, the light reflectance of the first plane 30a of the diffuser plate 30 that faces the hot cathode tube 17 is varied along the direction parallel to the short sides (refer to FIGS. 10 and 11) with the dot pattern of the light reflecting portion 32 being varied. That is, as shown in FIG. 10, the diffuser plate 30 is configured such that, in the first plane 30a as a whole, the light reflectance of a part (hereinafter referred to as a light-source overlapping portion DA) overlapping with the hot cathode tube 17 is larger than the light reflectance of a part (hereinafter referred to as a light-source non-overlapping portion DN) not overlapping with the hot cathode tube 17. Note that, as shown in FIG. 13, the light reflectance of the first plane 30a of the diffuser plate 30 is set almost invariable and substantially uniform along the direction along the long sides (refer to FIG. 10).

The distribution of the light reflectance of the diffuser plate 30 will be described in detail. As shown in FIGS. 10 to 12, along the direction along the short sides, the light reflectance of the diffuser plate 30 continuously decreases in a direction oriented away from the hot cathode tube 17 and continuously increases in a direction oriented toward the hot cathode tube 17, and the distribution thereof is configured to take the form of a normal distribution (a bell-shaped curve). Specifically, the light reflectance of diffuser plate 30 reaches a maximum in the central position (a position corresponding to the center of the hot cathode tube 17) thereof in the direction along the short sides, and reaches a minimum in the opposite end positions thereof in the direction along the short sides. The maximum value of this light reflectance is set to, for example, about 65%, whereas the minimum value thereof is set to, for example, about 30% to be equivalent to the light reflectance of the diffuser plate 30 itself. Thus, it can be acknowledged that only a small or substantially no portion of the light reflecting portion 32 is arranged in the respective end positions in the diffuser plate 30 in the direction along the short sides thereof.

In order to configure the light reflectance thereof to assume the above described distribution, the light reflecting portion 32 is formed in the following manner. That is, the areas of the respective dots 32a constituting the light reflecting portion 32 are: the largest for the dots 32a that correspond to the central position of the diffuser plate 30, i.e., the central position of the hot cathode tube 17, in the direction along the short sides; smaller for the dots 32a located farther from the above position; and the smallest for the dots 32a located at the extreme ends of the diffuser plate 30 in the direction along the short sides. That is, the areas of the respective dots 32a are determined in a manner such that the larger the distances thereof from the center of the hot cathode tube 17, the smaller the areas thereof. According to the diffuser plate 30 thus configured, the brightness distribution of the illumination light of the diffuser plate 30 as the whole can be smoothen, which consequently makes it possible to achieve a smooth distribution of the illumination brightness of the backlight unit 12 as a whole. In addition, as means for adjusting the light reflectance, the dots 32a of the light reflecting portion 32 may be unified in area but changed in space therebetween.

Given the structure of this embodiment as described above, the operation thereof is subsequently described. The liquid crystal panel 11 and the backlight unit 12 are manufactured separately and then assembled with each other by use of the bezel 13 and the like, whereby the liquid crystal display device 10 shown in FIGS. 3 and 4 is manufactured. Among these manufacturing processes, assembly work in manufacturing the backlight unit 12, particularly work for attaching the reflection sheet 20 and the support member 21 to the chassis 14, will be described in detail.

At the beginning, starting from the state shown in FIG. 2, work for laying down the reflection sheet 20 inside the chassis 14 is performed, which is followed by work for attaching the support members 21 to the receiving portions 33 of the chassis 14. Here the state of this reflection sheet 20 is such that bending of the rising portions 20b from the bottom portion 20a and of the outward-extending portions 20c from the rising portions 20b has been already performed thereon in a stage prior to the attachment. When the reflection sheet 20 is housed inside the chassis 14, the bottom portion 20a is received by the bottom panel 14a. At the same time, the rising portions 20b are received by the receiving surfaces 33a in the respective receiving portions 33, and the outward-extending portions 20c are received by the receiving panels 14c. In attaching the support members 21 thereafter, a worker can perform the work with the support portions 26 gripped in the hands. Each of the support members 21 is pushed backward along the Z-axis direction from the state shown in FIG. 9, whereby the two attachment pieces 27 thereof are inserted through the insertion hole 29 of the rising portion 20b. Here, workability for the attachment is favorable because the axial directions of the support portions 26 agree with the Z-axis direction, i.e., the axial directions of the attachment pieces 27 and the directions along which the support members 21 are attached and detached. In this process, the guide surface 34a in each of the first attachment pieces 27A is caused to make contact with and slide on the receiving portion 33, whereby the first attachment piece 27A is elastically deformed and displaced away from the second attachment piece 27B and the receiving portion 33 along the X-axis direction. The second attachment piece 27B is allowed to guide an action for attaching the support member 21 by making contact with and sliding on the wall surface of the receiving portion 33. When the support member 21 is pushed to a predetermined depth, the first attachment piece 27A elastically restores the original state at the same time as the engagement projection 34 enters into the engagement hole 35, as shown in FIG. 8. At this time, the engagement projection 34 engages with the hole edge of the engagement hole 35 at the same time as the receiving portion 33 is caught between the two attachment pieces 27, whereby the support member 21 is restricted from being displaced along the Z-axis direction in a manner coming off the receiving portion 33. That is, it is possible to keep the support member 21 attached to the receiving portion 33.

Incidentally, there is a risk that an angle at which each bent portion in the reflection sheet 20 is bent is formed smaller or larger than intended, since it is difficult to regularly control the angle so that the angle may be stable. For example, when an angle (a rising angle) at which any one of the rising portions 20b is bent with respect to the bottom portion 20a is larger than a set value, there is a possibility that the rising portion 20b is brought into a floating state with a gap held between the rising portion 20b and the receiving surface 33a of the receiving portion 33. Even in that case, the attachment of the support member 21 to the rising portion 20b from the frontward side not only causes the pressing surface 28 of the pressing portion 25 to press the rising portion 20b from the frontward side but also reposition the rising portion 20b that has been brought in the floating state. The rising angle with respect to the bottom portion 20a is thereby returned to the set value. As shown in FIGS. 7 and 8, with the support member 21 thus attached, a predetermined range of the hole edge around the insertion hole 29 in the rising portion 20b is not only pressed by the pressing surface 28 of the pressing portion 25 from the frontward side but also received by the receiving surface 33a of the receiving portion 33 from the backward side. Specifically, while the pressing surface 28 of the pressing portion 25 presses the entirety of a circumferential portion around the insertion hole 29 from the frontward side, the receiving surface 33a of the receiving portion 33 is configured to receive parts (refer to FIG. 7) of the circumferential portion around the insertion hole 29 between which the attachment pieces 27 are sandwiched in the frontward and backward direction along the Y-axis direction. It is thereby possible to hold these parts with these parts interposed between the receiving surface 33a and the pressing surface 28. Thus, the shapes of the rising portions 20b of the reflection sheet 20 can be stably maintained by use of the support members 21 and the receiving portions 33.

After the reflection sheet 20 and the support members 21 are thus attached to the chassis 14, the hot cathode tube 17 having the sockets 18 mounted thereon, and the holders 19 are housed inside the chassis 14. Then, the frames 16 are attached at the same time as the diffuser plate 30 and the optical sheets 31, which constitute the optical members 15, are sequentially attached to the opening 14e, whereby the assembly of the backlight unit 12 is completed.

In a case where the liquid crystal display device 10 thus manufactured is used, when the hot cathode tube 17 is turned on, light emitted from the hot cathode tube 17 enters the first surface 30a of the diffuser plate 30 directly therefrom or indirectly after being reflected by components (the holders 19, the reflection sheet 20, the support members 21 and the like) arranged inside the chassis 14. After having passed through the diffuser plate 30, the light is emitted toward the liquid crystal panel 11 through the optical sheets 31.

Here, the indirectly entering light directed to the diffuser plate 30 is mainly light reflected by the reflection sheet 20, which has been laid down in the substantially whole area inside the chassis 14 (FIGS. 2 and 6). In the reflection sheet 20, as shown in FIGS. 3 and 7, each of the rising portions 20b arranged in the light-source non-arrangement areas LN is configured in a form standing up frontward from the bottom portion 20a arranged in the light-source arrangement area LA. Therefore, a distance between the rising portion 20b and the diffuser plate 30, i.e., a space across which light comes and goes in the chassis 14, gradually narrows from the rising base end toward the rising top end (in a direction oriented away from the hot cathode tube 17). Here, the quantity of light inside the chassis 14 tends to vary roughly in inverse proportion to the distance from the hot cathode tube 17 and to be smaller in the light-source non-arrangement areas LN than in the light-source arrangement area LA. Consequently, a dark portion is likely to occur in the light-source non-arrangement areas LN. This embodiment copes with this in a manner such that, in the light-source non-arrangement areas LN tending to have a low light quantity, the rising portions 20b are used not only to narrow a space across which light comes and goes but to angle the reflected light so as to direct the reflected light toward the central part of the screen. Therefore, the light-source non-arrangement areas LN are unlikely to be visually recognized to have a dark portion. Additionally, the pressing portion 25 in each of the support members 21 has a size enough to press a part of either of the rising portions 20b along a direction (the Y-axis direction) parallel to the short sides thereof, which results in downsizing of the pressing portion 25 as compared to a hypothetical case where the pressing portion 25 has a size enough to press the whole length of the rising portion. Thus, the pressing portions 25 account for a smaller proportion of the surface area of the chassis 14 than the reflection sheet 20. Therefore, unevenness is unlikely to occur in the light reflectance and the reflected light inside the chassis 14 despite a difference in light reflectance between the reflection sheet 20 and each of the support members 21.

Next, the light reflecting function that the diffuser plate 30 has will be described in detail. As shown in FIG. 10, the light reflecting portion 32, the light reflectance of which varies by region, is formed on the first plane 30a of the diffuser plate 30 into which light emitted from the hot cathode tube 17 enters. This makes it possible to suitably control the efficiency of light entrance by region. Specifically, light entering in the light-source overlapping portion DA, within the first plane 30a, which overlaps with the hot cathode tube 17 is mainly light directly entering therein from the hot cathode tube 17, and the light source overlapping portion DA has a higher light quantity than the light-source non-overlapping portion DN. On this basis, the light reflectance of the light reflecting portion 32 in the light source overlapping portion DA is set relatively high (refer to FIGS. 10 and 12), whereby it is possible both to restrict (regulate) entrance of light into the first plane 30a and to cause much light to be reflected back to the inside of the chassis 14. Meanwhile, the light-source non-overlapping portion DN of the first plane 30a not overlapped with the hot cathode tube 17 receives less direct light from the hot cathode tube 17, and thus has relatively smaller quantity of light than that in the light source overlapping portion DA. On this basis, the light reflectance of the light reflecting portion 32 in the light-source non-overlapping portion DN is set relatively low (refer to FIGS. 10 and 12), whereby it is possible to encourage entrance of light into the first plane 30a. In this case, the light quantity is supplemented in a manner such that light reflected to the inside of the chassis 14 by the light reflecting portion 32 in the light source overlapping portion DA is guided toward the light-source non-overlapping portion DN by the above described reflection sheet 20. The quantity of light entering in the light-source non-overlapping portion DN can be thereby sufficiently secured.

Incidentally, when the hot cathode tube 17 is turned on or turned off, a change occurs in the temperature environment inside the chassis 14, and sometimes causes thermal expansion or thermal contraction of the reflection sheet 20 arranged inside the chassis 14. In the reflection sheet 20, although the shape of the bottom portion 20a arranged along the bottom panel 14a of the chassis 14 is relatively stably maintained as shown in FIGS. 3 and 7, the shapes of the rising portions 20b are likely to be destabilized not only because the shapes thereof slope with respect to the bottom portion 20a but also because a gap is held between each thereof and the bottom panel 14a. Specifically, distortion or bending occurs in the rising portion 20b with thermal expansion or thermal contraction of the reflection sheet 20, which makes it likely that the rising portion 20b is deformed (displaced) in a manner approaching the diffuser plate 30. This embodiment copes with this by configuring the rising portions 20b to be pressed by the pressing surfaces 28 in the pressing portions 25 of the support members 21 from the frontward side and received by the receiving surfaces 33a in the receiving portions 33 from the backward side at the same time. Thus, the rising portions 20b are prevented from being deformed in a manner approaching or leaving from the diffuser plate 30.

Specifically, the rising portions 20b are pressed by the support members 21 and the receiving portions 33 both from the frontward side and the backward side. Thus, the rising portion 20b can be prevented from being displaced either frontward or backward, whereby the shapes of the rising portions 20b can be kept stable. Although being configured to press only parts of the rising portions 20b within the surfaces thereof, these support members 21 and receiving portions 33 are enabled to stably press (receive) the whole rising portions 20b. This is because the support members 21 and the receiving portions 33 are divided into groups, each consisting of two or more thereof, and are dispersed by group when being arranged within the surfaces of the rising portions 20b. Not only that, the respective rising portions 20b include parts each caught between corresponding ones of the support members 21 and the receiving portions 33, whereby the shapes of the rising portions 20b can be more stably maintained. Thus, the shapes of the rising portions 20b can be stabilized, whereby the directivity of light reflected by the rising portions 20b can be stabilized. Consequently, unevenness is less likely to occur in light that is irradiated to the diffuser plate 30 and then emitted to the outside of the backlight unit 12.

As explained above, the backlight unit 12 of this embodiment includes: the hot cathode tube 17 which is a light source; the chassis 14 housing the hot cathode tube 17; the reflection sheet 20 arranged inside the chassis 14 and configured to reflect light; the optical members 15 arranged so as to face one side of the hot cathode tube 17 that faces the light emitting side; and the support members 21 each of which has an axis crossing a space inside the chassis 14 and is provided with the support portion 26 configured to support the optical members 15 from the side opposite to the light emitting side. Each of the support members 21 has the pressing surface 28 enabled to press the reflection sheet 20 from the light emitting side and having a form intersecting both the axial direction of the support portion 26 and a direction (the plate surfaces of the optical members 15; a plane orthogonal to the axial direction) orthogonal to the axial direction.

This configuration makes it possible to support the optical members 15 from the side opposite to the light emitting side by using the support portions 26 of the support members 21. On this basis, even in a case where the reflection sheet 20 has, for example, a form intersecting both the axial direction of each of the support portions 26 and a direction orthogonal to the axial direction, the reflection sheet 20 can be suitably pressed from the light emitting side by the pressing surface 28 of the support member 21. Because the shape of the reflection sheet 20 can be thereby stably maintained, the directivity of light reflected thereby can be stabilized, and, consequently, unevenness is unlikely to occur in light emitted from the backlight unit 12.

Further, the chassis 14 has the bottom panel 14a which is arranged toward one side of the hot cathode tube 17 that faces away from the light emitting side. Whereas, while the reflection sheet 20 has the bottom portion 20a arranged along the bottom panel 14a and the rising portions 20b standing up from the bottom portion 20a toward the light emitting side, the support members 21 have the pressing surfaces 28 arranged in positions overlapping with the rising portions 20b in a plan view. With this configuration, the rising portions 20b in the reflection sheet 20 have forms standing up from the bottom portion 20a toward the light emitting side, and thereby, inevitably tend to be easily destabilized in a manner, for example, that the rising angles thereof with respect to the bottom portion 20a fluctuate or that deformation such as distortion or bending occurs therein. This embodiment copes with this by providing the support members 21 with the pressing surfaces 28 each of which has a form intersecting both the axial direction of the support portion 26 and a direction orthogonal to the axial direction and by having the pressing surfaces 28 arranged in positions overlapping with the rising portions 20b in a plan view. Accordingly, the rising portions 20b can be suitably pressed by the pressing surfaces 28 from the light emitting side, and can be restricted from being displaced toward the light emitting side. This makes it possible to prevent the rising angles of the rising portions 20b with respect to the bottom portion 20a from changing, and deformation such as distortion or bending from occurring in the rising portions 20b. That is, the shapes of the rising portions 20b can be stably maintained, whereby the directivity of light reflected thereby can be stabilized. Consequently, unevenness is unlikely to occur in light emitted from the backlight unit 12.

Further, the angle that the pressing surface 28 forms with a direction orthogonal to the axial direction is set substantially equal to the rising angles of the rising portions 20b with respect to the bottom portion 20a. This configuration makes it possible to reliably press the rising portions 20b from the light emitting side by use of the pressing surfaces 28 of the support members 21, thereby being excellent in shape stability.

Further, the angle that the pressing surface 28 forms with a direction orthogonal to the axial direction, and the rising angles of the rising portions 20b with respect to the bottom portions 20a are set acute together. This configuration makes it possible to angle, on the basis of the rising angles with respect to the bottom portion 20a, light reflected by the rising portions 20b. With the acute rising angles of the rising portion 20b, light is effectively exited. The rising portions 20b, the rising angles of which are set acute, can be suitably pressed by the pressing surfaces 28 which form acute angles with the direction orthogonal to the axial direction.

Further, the chassis 14 is formed so that the bottom panel 14a may be arranged across a range overlapping with the rising portions 20b in a plan view. With this configuration, a range across which to form the bottom panel 14a is larger than in a hypothetical case where the bottom panel 14a is arranged across a range overlapping only with the bottom portion 20a in a plan view. Thus, the bottom panel 14a formed across the thus large range can be utilized for installation of other components or the like purpose. On the other hand, although the shapes of the rising portions 20b tend to be easily destabilized because of a gap inevitably held between each of the rising portions 20b standing up from the bottom portion 20a and the bottom panel 14a, the rising portions 20b can be maintained in appropriate shapes by use of the pressing surfaces 28.

Further, each of the receiving portions 33 enabled to receive the rising portions 20b from the side opposite to the light emitting side is provided between the bottom panel 14a and either of the rising portions 20b. This configuration enables the receiving portions 33 and the support members 21 to press the rising portions 20b from both the light emitting side and the side opposite to the light emitting side. The shapes of the rising portions 20b can be thereby maintained more stably.

Further, the support members 21 are attached to the receiving portions 33. This configuration makes it possible to easily interpose and hold each of the rising portions 20b between corresponding ones of the pressing surfaces 28 and the receiving portions 33 by directly attaching the support members 21 to the receiving portions 33. The shapes of the rising portions 20b can be thereby maintained more stably.

Further, while each of the receiving portions 33 has a wall-like shape standing up toward the light emitting side from the bottom panel 14a, each of the support members 21 has the pair of attachment pieces 27 enabled to sandwich and hold the receiving portion 33 therebetween from both sides of the receiving portion 33 along the plate thickness thereof. With this configuration, keeping the support members 21 thus attached is made possible by having each of the wall-like receiving portions 33 caught between the paired attachment pieces 27 from both sides of the receiving portion 33 along the plate thickness thereof.

Further, the receiving portion 33 and at least any one of the attachment pieces 27 in each pair have an engagement structure enabling engagement therebetween. With this configuration, stably keeping the support member 21 attached to the receiving portion 33 is made possible by the engagement structure.

Further, the engagement structure is composed of: the engagement projection 34 provided to at least any one of the attachment pieces 27 in each pair and configured to project toward a corresponding one of the receiving portions 33; and the engagement hole 35 provided to the receiving portion 33 and enabled to accept the engagement projection 34. With this configuration, the attachment of the support member 21 to the receiving portion 33 causes the engagement projection 34 in the at least one attachment piece 27 in the pair to enter into the engagement hole 35 in the receiving portion 33 and engage with the hole edge thereof. The support member 21 can be thereby stably kept attached to the receiving portion 33.

Further, the end portions in the bottom panel 14a have the side panels 14b standing up toward the light emitting side, and the rising end portions of these side panels 14b have the receiving panels 14c overhanging outward. Whereas, the rising end portions in the rising portions 20b have the outward-extending portions 20c extending outward along the receiving panels 14c. With this configuration, the bottom portion 20a and the outward-extending portions 20c, in the reflection sheet 20, are arranged along the bottom panel 14a and the receiving panels 14c, respectively, whereby it is possible to further stabilize the shapes of the rising portions 20b each located between the bottom portion 20a and a corresponding one of the outward-extending portions 20c.

Further, the support members 21 are formed so that the pressing surfaces 28 thereof may press parts of the rising portions 20b along a direction oriented from the bottom portion 20a toward the rising portions 20b. This configuration makes it possible to downsize the support members 21 as compared to a hypothetical case where the support members press the whole lengths of the rising portions 20b. Thus, unevenness is unlikely to occur in light reflectance inside the chassis 14 despite a difference in light reflectance between the reflection sheet 20 and each of the support members 21.

Further, each of the pressing surfaces 28 and each of the rising portions 20b both have sloping shapes. With this configuration, the rising portions 20b each having a sloping shape can be suitably pressed by the pressing surfaces 28 each having a sloping shape likewise.

Further, the axial directions of the support portions 26 are set to a direction substantially orthogonal to the plate surfaces of the optical members 15. This configuration enables the support portions 26 to more suitably support the optical members 15. This makes the support portions 26 unlikely to be visually recognized as dark portions when viewed through the optical members 15, thereby making this embodiment more preferable in preventing uneven brightness.

Further, directions along which the support members 21 are attached to and detached from the chassis 14 substantially agree with the axial directions of the support portions 26 thereof. This configuration provides excellent workability when the support members 21 are attached or detached with the support portions 26 gripped in the hands.

Further, the chassis 14 is divided into: the light-source arrangement area LA having the hot cathode tube 17 arranged therein; and the light-source non-arrangement areas LN not having the hot cathode tube 17 arranged therein. With this configuration, the light-source non-arrangement areas LN not having the hot cathode tube 17 arranged therein are set up inside the chassis 14, whereby the number of the hot cathode tubes 17 can be reduced as compared to a case where the hot cathode tubes 17 are placed evenly all over the chassis 14. This makes it possible to achieve cost reduction and power saving for the backlight unit 12.

Further, the chassis 14 is divided at least into: the first end portion 14A; the second end portion 14B located at an end portion opposite to the first end portion 14A; and the middle portion 14C sandwiched between these first and second end portions 14A and 14B. Among these portions, the middle portion 14C is set as the light-source arrangement area LA, and the first end portion 14A and the second end portions 14B are set as the light-source non-arrangement areas LN. This configuration makes it possible to secure sufficient brightness in the middle portion of the backlight unit 12. Therefore, the brightness of the middle portion of the display is ensured also in the liquid crystal display device 10 provided with the backlight unit 12, which makes it possible to obtain favorable visibility.

Further, the chassis 14 has the bottom panel 14a which is arranged toward one side of the hot cathode tube 17 that faces away from the light emitting side. Whereas, while having the bottom portion 20a arranged along the bottom panel 14a and the rising portions 20b standing up from the bottom portion 20a toward the light emitting side, the reflection sheet 20 has at least a part of the bottom portion 20a arranged in the light-source arrangement area LA and at least parts of the rising portions 20b arranged in the light-source non-arrangement areas LN. The light quantities inside the chassis 14 tend to lower in the light-source non-arrangement areas LN than in the light-source arrangement area LA. Despite this tendency, it is possible to, by arranging in the light-source non-arrangement areas LN the rising portions 20b standing up toward the light emitting side from the bottom portion 20a, make dark portions unlikely to occur in the light-source non-arrangement areas LN. Uneven brightness can be thereby prevented.

Further, the diffuser plate 30 provided as one of the optical members 15 is configured so that, at least within the first plane 30a thereof facing toward the hot cathode tube 17, portions (the light-source non-overlapping portions DN) overlapping with the light-source non-arrangement areas LN may be higher in light reflectance than a portion (the light-source overlapping portion DA) overlapping with the light-source arrangement area LA. This configuration causes light emitted from the hot cathode tube 17 to first reach, within the optical members 15, portions relatively high in light reflectance and therefore causes much of the light to be reflected by (that is, does not pass through) these portions, thereby resulting in relatively low brightness of the illumination light despite the quantity of light emitted from the hot cathode tube 17. On the other hand, this configuration enables the light reflected thereby to be reflected inside the chassis 14 and reach the light-source non-arrangement areas LN. Because the portions, within the optical members 15, overlapping with the light-source non-arrangement areas LN are relatively low in light reflectance, more light passes through these portions than otherwise, which makes it possible to obtain a predetermined level of brightness of the illumination light therefrom.

Further, the diffuser plate 30 is configured such that, at least within the first plane 30a thereof facing toward the hot cathode tube 17, the light reflectance thereof decreases along a direction oriented away from the hot cathode tube 17. This configuration makes it possible to equalize the brightness of the illumination light among the light-source arrangement area LA and the light-source non-arrangement areas LN.

Further, the support members 21 are configured so as to have the outer surfaces appearing in a white color. This configuration makes it possible to favorably reflect light by the outward surfaces of the support members 21, thereby enabling effective utilization of light emitted from the hot cathode tube 17.

Further, the light source is formed of the hot cathode tube 17. This configuration enables achievement of a higher level of brightness.

While the first embodiment of the present invention is described above, the present invention is not limited to above detailed embodiment, and may include, for example, the following modifications. Note that, in each of the following modifications, the same reference signs denote members similar to those of the above embodiment, and description thereof is not repeated here.

First Modification of First Embodiment

A first modification of the first embodiment will be described with reference to FIG. 14. Herein, a modification obtained by changing the shapes of rising portions 20b-1, pressing portions 25-1 and receiving portions 33-1 is shown. Note that FIG. 14 is a cross-sectional view illustrating enlarged views of the main parts of support members, a reflection sheet and receiving portions according to this modification.

Figure 14:
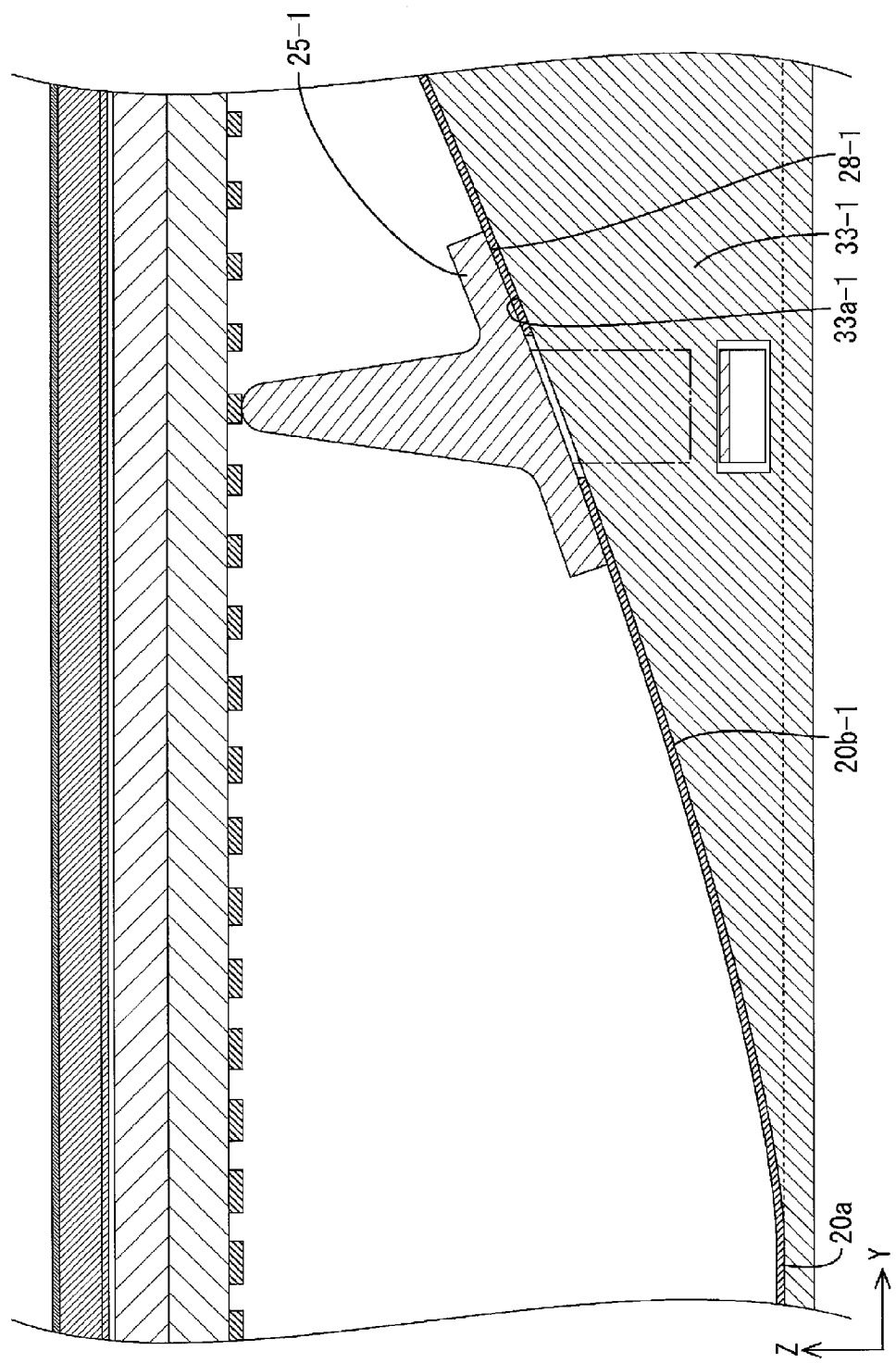
FIG. 14 is a cross-sectional view obtained by enlarging a part of a support member, a reflection sheet and a receiving section according to a first modification of the first embodiment.

As shown in FIG. 14, all of the rising portions 20b-1, the pressing portions 25-1 and the receiving portions 33-1 are configured in substantially arc-like cross-sectional shapes (arched cross-sectional shapes). Specifically, the respective rising portions 20b-1 have substantially arc-like shapes which are bent backward, so that each of the rising portions 20b-1 as a whole is arranged nearer to the bottom panel 14a than a line (a subtense) connecting the rising base end and the rising top end is. The rising portions 20b-1 are configured to be standing up from the bottom portion 20a at rising angles substantially equal to those in the first embodiment described above. These rising angles are angles that tangent lines to the respective rising portions 20b-1 that pass through the rising base ends thereof form with the bottom portion 20a. On the other hand, each of the pressing portions 25-1 and each of the receiving portions 33-1 are configured in cross-sectional shapes having curvatures substantially equal to those of the rising portions 20b-1, and are provided with a pressing surface 28-1 and a receiving surfaces 33a-1 both having substantially arc-like shapes which conform with each of the rising portions 20b-1. The angles that the pressing surfaces 28-1 and the receiving surfaces 33a-1 form with the Y-axis direction are substantially equal to the rising angles of the rising portions 20b-1. Even with the rising portions 20b-1 each having a shape thus curved in an arc, it is possible to maintain the rising portions 25b-1 in appropriate shapes by configuring the pressing portions 25-1 and the receiving portion 33-1 in the same shapes.

Second Modification of the First Embodiment

A second modification of the first embodiment will be described with reference to FIG. 15. Herein, a modification obtained by changing the distribution of light reflectance in the first plane 30a of the diffuser plate 30 is shown. Note that FIG. 15 is a graph illustrating changes in light reflectance in the direction along the short sides of the diffuser plate according to this modification.

Figure 15:
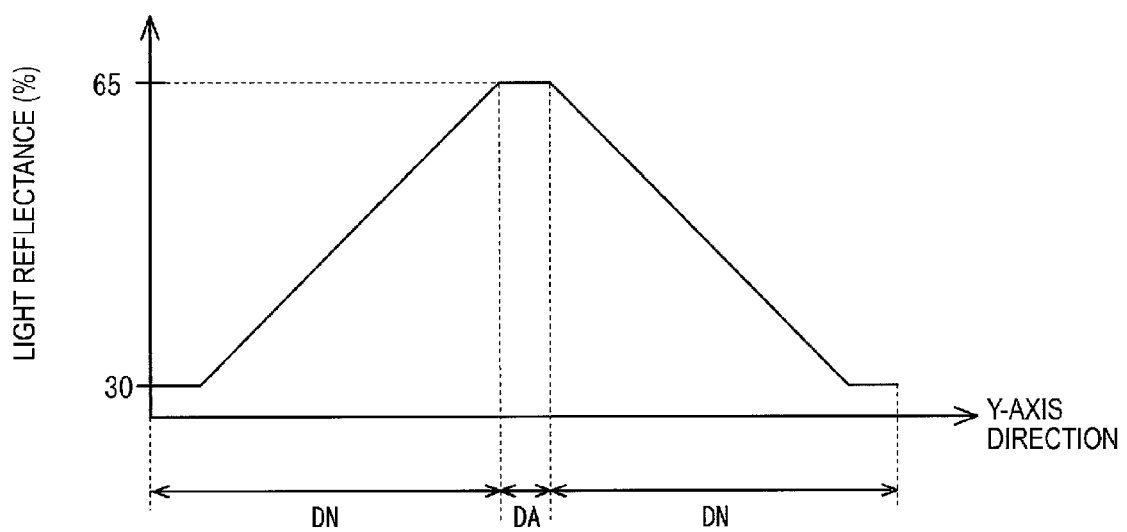
FIG. 15 is a graph illustrating changes in light reflectance in a direction along the short side of a diffuser plate according to a second modification of the first embodiment.

Within the first plane 30a of the diffuser plate 30, the light reflectance in the light-source overlapping portion DA is set to, for example, 65% and generally uniform as shown in FIG. 15, and shows the maximum value in the diffuser plate 30. On the other hand, the light reflectance in the light-source non-overlapping portions DN gradually and continually decreases (shows sloping changes) along directions oriented away from the light source overlapping portion DA, and the light reflectance in the end portions of the diffuser plate 30 in the direction (the Y-axis direction) parallel to the short sides thereof is set to 30%, which is the minimum value in the diffuser plate 30. The dots 32a constituting the light reflecting portion 32 are formed so that, while the areas thereof in the light-source overlapping portion DA may be the largest and equal to each other, the areas thereof in the light-source non-overlapping portions DN may gradually and continually decrease in inverse proportion to the distance from the light-source overlapping portion DA.

Third Modification of First Embodiment

A third modification of the first embodiment will be described with reference to FIG. 16. Herein, a modification obtained by further changing the distribution of light reflectance in the first plane 30a of the diffuser plate 30 is shown. Note that FIG. 16 is a graph illustrating changes in light reflectance in the direction along the short sides of the diffuser plate according to this modification.

Figure 16:
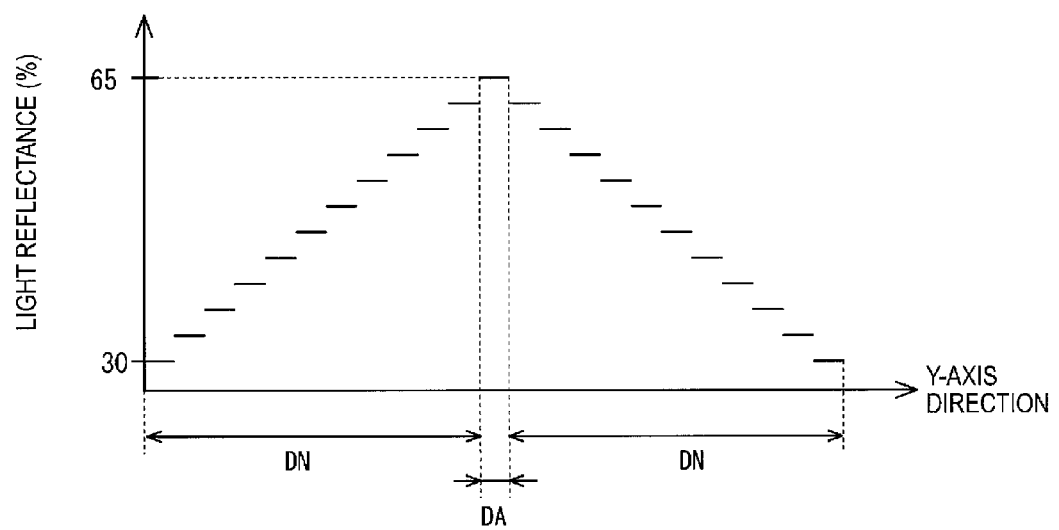
FIG. 16 is a graph illustrating changes in light reflectance in a direction along the short side of a diffuser plate according to a third modification of the first embodiment.

The light reflecting portion 32 is formed so that the light reflectance thereof within the first plane 30a of the diffuser plate 30 may decrease in a stepwise and sequential manner along a direction oriented away from the light source overlapping portion DA toward each of the light-source non-overlapping portions DN as shown in FIG. 16. That is, the areas (the light reflectance) of the dots 32a constituting the light reflecting portion 32 are formed so that, while the areas thereof in the light-source overlapping portion DA may be the largest and equal to each other, the areas thereof in each of the light-source non-overlapping portions DN may decrease in a stepwise and sequential manner from one predetermined region to another in a direction oriented away from the light-source overlapping portion DA and be the smallest in the end portions of the diffuser plate 30 in the direction (the Y-axis direction) parallel to the short sides thereof. That is, in the light-source non-overlapping portion DN in the light reflecting portion 32, the changes in light reflectance show a stripe pattern along the direction (the Y-axis direction) parallel to the short sides of the diffuser plate 30. This configuration enables the brightness of the illumination light emitted from the diffuser plate 30 to form a gently sloping distribution. Further, the means in which to thus form two or more regions different in light reflectance in a stepwise manner can simplify the method for manufacturing the diffuser plate 30 and thereby contribute to cost reduction therefor.

Second Embodiment

Second embodiment of the invention will be described with reference to FIGS. 17 to 19. The second embodiment shows an example obtained by changing the structure of receiving portions 133 and a structure for attaching support members 121. Note that redundant description on structures, operation and effect similar to those of the first embodiment described above is not repeated here.

Figure 17:
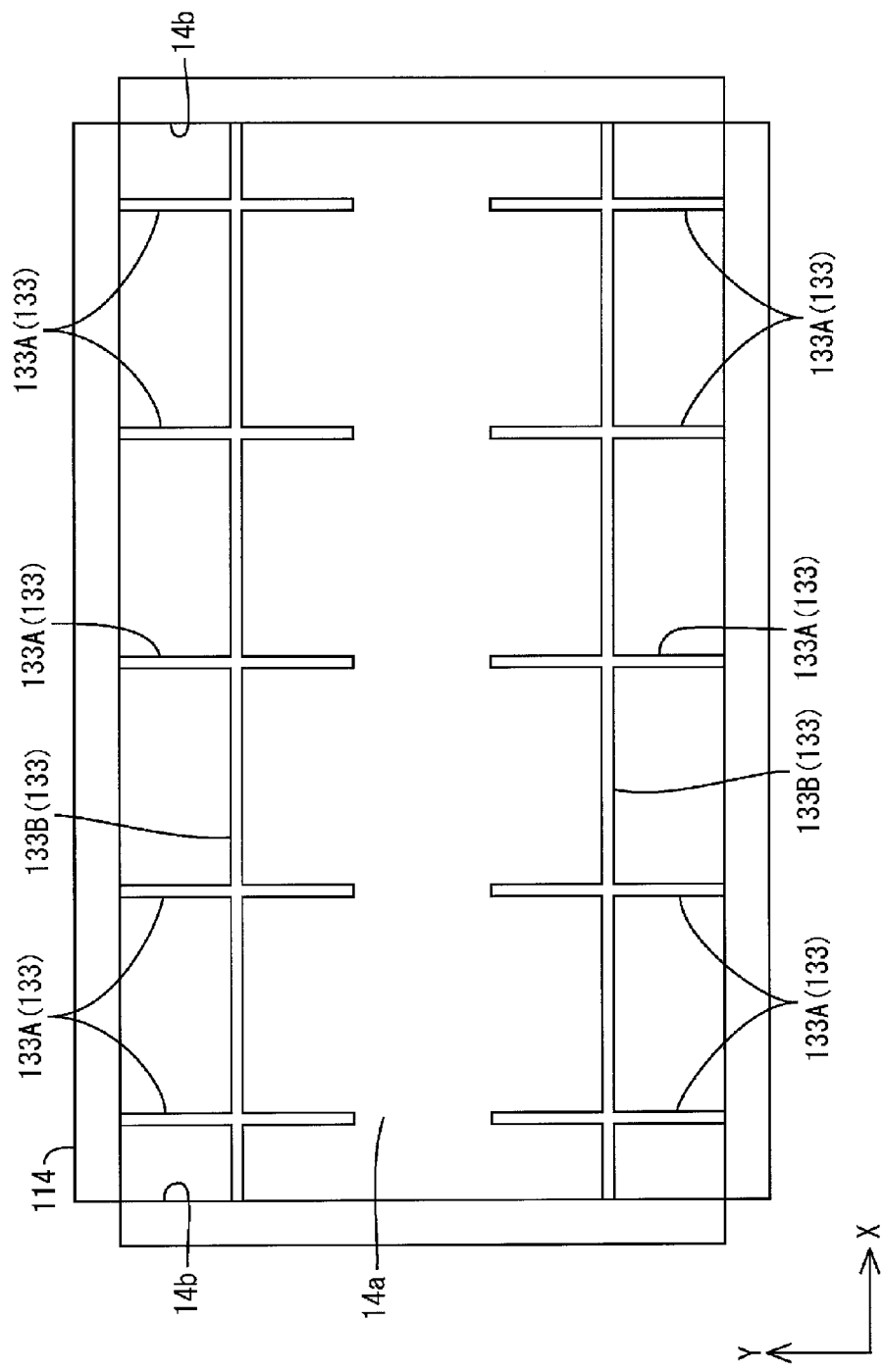
FIG. 17 is a plan view of a chassis according to a second embodiment of the present invention.

FIG. 17 is a plan view of a chassis; FIG. 18 is a plan view illustrating a configuration for arranging a hot cathode tube and the support members in the chassis; and FIG. 19 is a cross-sectional view taken along the xix-xix line of FIG. 17.

Figure 18:
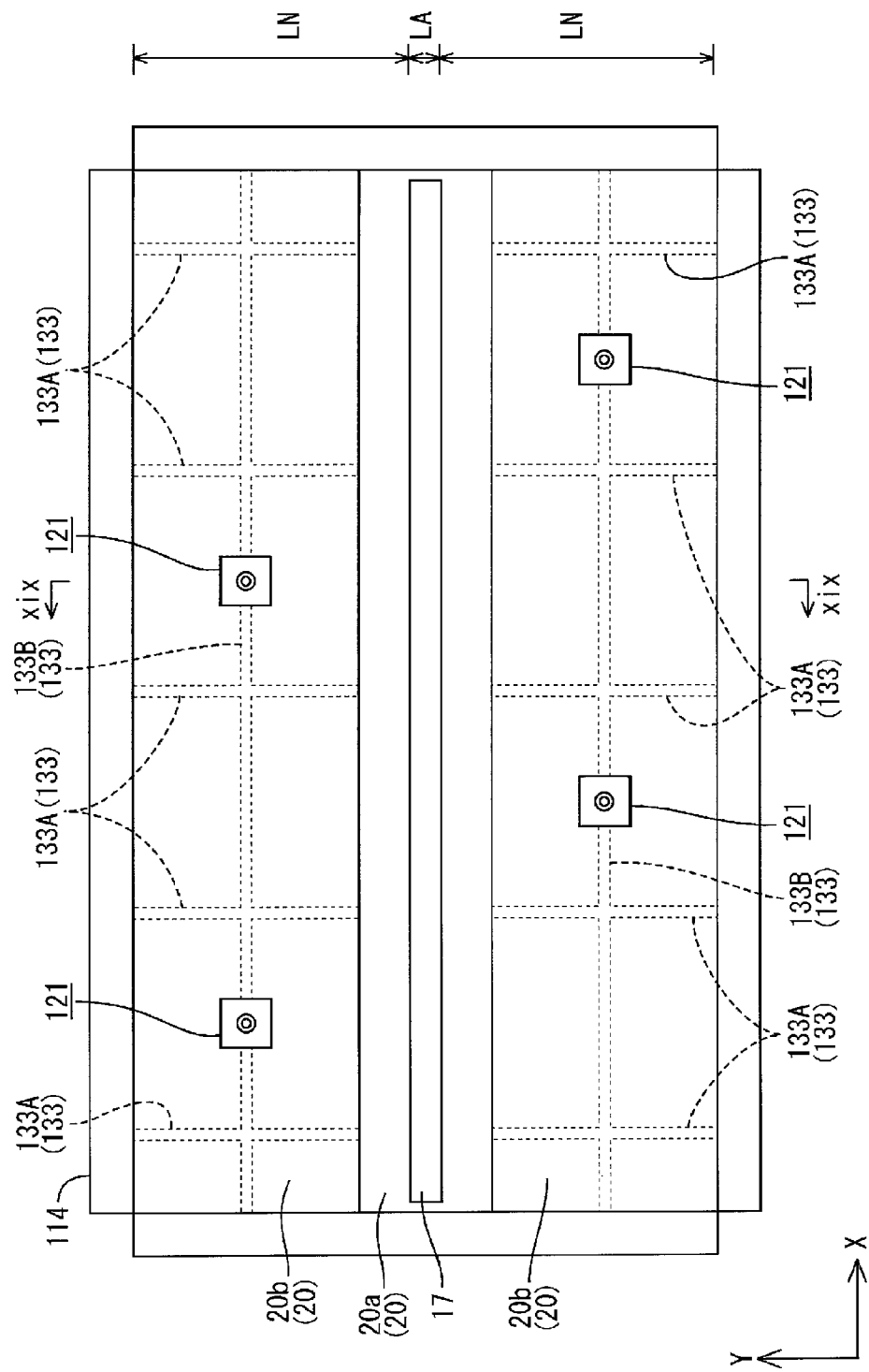
FIG. 18 is a plan view illustrating a configuration for arranging a hot cathode tube and support members in the chassis.
Figure 19:
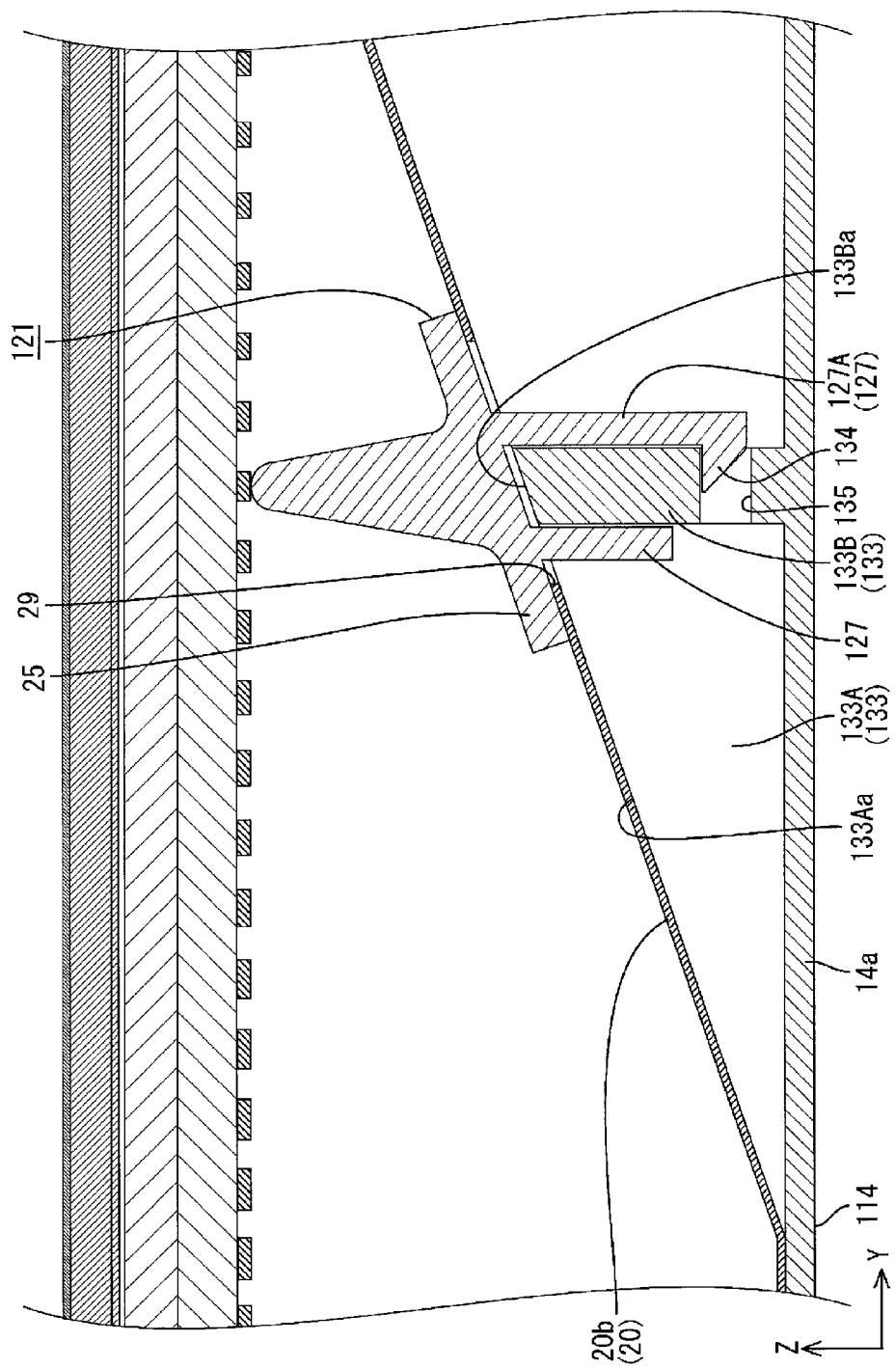
FIG. 19 is a cross-sectional view taken along the xix-xix line of FIG. 17.

As shown in FIGS. 17 to 19, each of the receiving portions 133 is composed of first receiving portions 133A and a second receiving portion 133B. Each of the first receiving portions 133A and the second receiving portion 133B intersect each other in a plan view. Specifically, the first receiving portion 133A has a wall-like shape standing up frontward from the bottom panel 14a, and having the main wall surface along the Y-axis direction. The first receiving portions 133A have sloping shapes extending along the rising portions 20b of the reflection sheet 20 and have first receiving surfaces 133Aa (FIG. 19) which receive the rising portions 20b from the backward side. The first receiving portions 133A are almost the same as the receiving portions 33 described in the first embodiment thus in terms of shape, and in terms of how and how many these portions are arranged in the bottom panel 14a. However, the first receiving portions 133A are different therefrom in not having engagement holes 35. The second receiving portion 133B has a wall-like shape standing up frontward from the bottom panel 14a and having the main wall surface along the X-axis direction, and is configured in a form substantially orthogonal to the first receiving portions 133A. The second receiving portions 133B are provided in a pair in the respective light-source non-arrangement areas LN in the bottom panel 14a. Each of the second receiving portions 133B is configured in a form crossing the central positions of corresponding ones of the first receiving portion 133A in the Y-axis direction and extending along the X-axis direction. Additionally, the second receiving portion 133B is formed continuously from the first receiving portions 133A crossing the second receiving portion 133B and also the ends of the second receiving portion 133B are continuously formed from the side plates 14b Thus, the second receiving portion 133B is enabled to further improve the strength of the chassis 114. The frontward surface of the second receiving portion 133B has a sloping shape running parallel to either of the rising portions 20b, and is provided as a second receiving surface 133Ba which receives the rising portion 20b from the backward side. The second receiving surface 133Ba and the first receiving surface 133Aa are formed substantially on the same plane and are substantially parallel to each other.

Furthermore, the support members 121 are attached to the second receiving portion 133B in the receiving portion 133. Specifically, the support members 121 are arranged in positions overlapping with the second receiving portions 133B in a plan view, and the four support members 121 are arranged inside the chassis 114 in a zigzag pattern in a plan view because sets, each consisting of two of the four support members 121, are attached to the respective second receiving portions 133B while being placed in positions intentionally misaligned with each other in the X-axis direction. Each of the support members 121 is arranged, on the second receiving portion 133B, at a position substantially middle of two of the first receiving portions 133A that are next to each other along the X-axis direction. Additionally, parts in the second receiving portion 133B to which the respective support members 121 are attached include engagement holes 135 which accept engagement projections 134 that first attachment piece 127A of the respective support members 121 are provided with. Each of the engagement holes 135 is configured in a form penetrating either of the second receiving portions 133B in a direction along the plate thickness thereof, that is, in the Y-axis direction. In contrast, a pair of attachment pieces 127 in each of the support members 121 is arranged in positions in the pressing portion 25 of the support member 121 that are spaced with a predetermined distance therebetween along the Y-axis direction, and are enabled to catch and hold the second receiving portion 133B therebetween from both sides thereof in the Y-axis direction. Note that the structures of these two attachment pieces 127 are substantially the same as those described in the first embodiment except for orientations in the arrangement thereof which are 90 degrees different from those in the first embodiment. Also, the arrangement of the insertion holes 29 formed in the rising portions 20b is changed corresponding to positions at which to attach the support members 121.

As described above, according to this embodiment, each of the receiving portions 133 is composed of the first receiving portions 133A and the second receiving portion 133B with each of the first receiving portions 133A and the second receiving portion 133B both having wall-like shapes standing up from the bottom panel 14a toward the light emitting side and, in a plan view, intersecting each other, and is configured such that each of the first receiving portions 133A and the second receiving portion 133B continue into each other. With this configuration, each of the first receiving portions 133A and the second receiving portion 133B, which intersect each other in a plan view, is configured in a form continuing into each other, whereby the strength of the chassis 114 can be improved.

Third Embodiment

A third embodiment of the invention will be described with reference to FIGS. 20 to 22. The third embodiment shows an example obtained by changing a structure for attaching support members 221. Note that redundant description on structures, operation and effect similar to those of the first embodiment described above is not repeated here.

Figure 20:
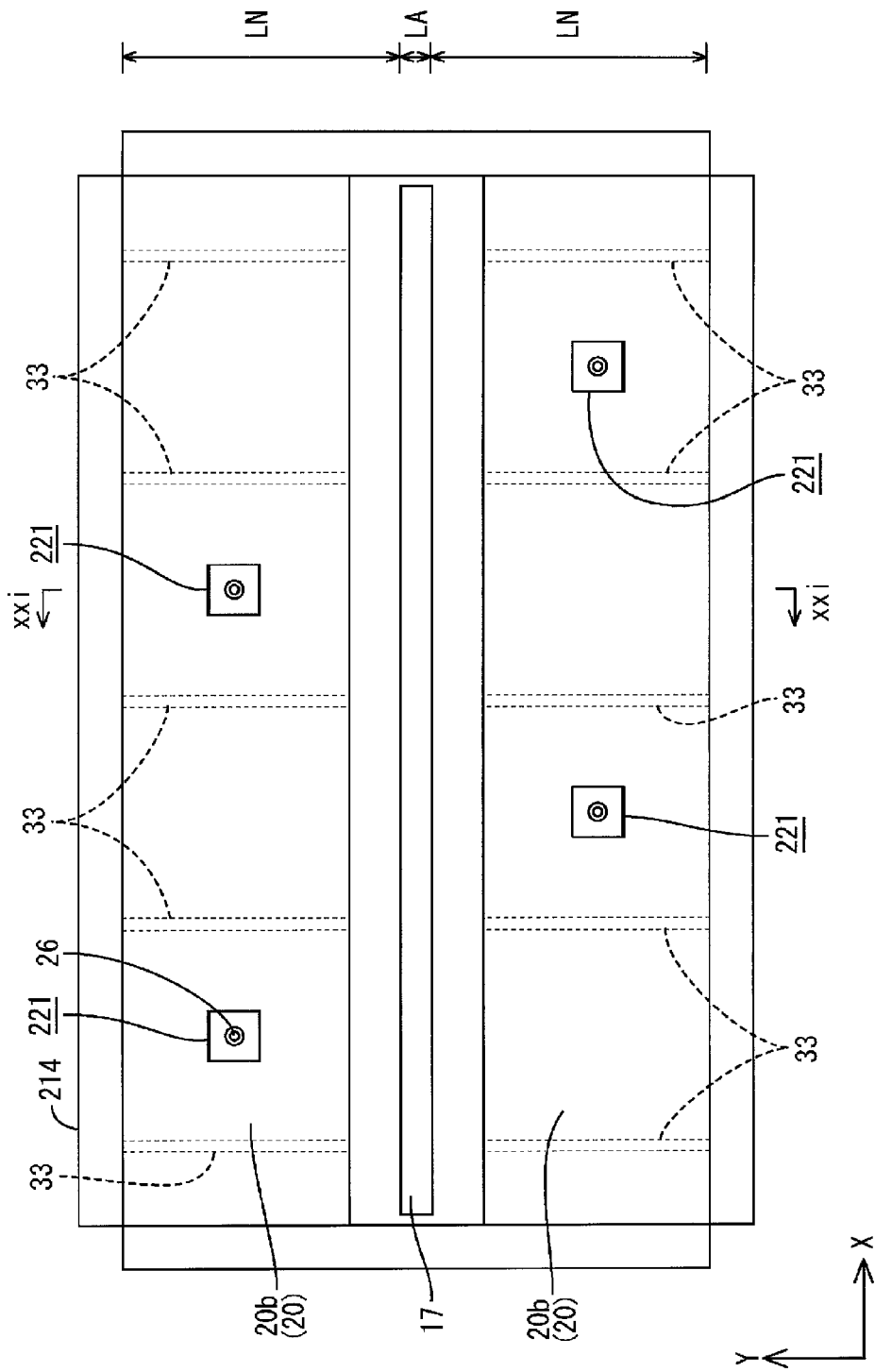
FIG. 20 is a plan view illustrating a configuration for arranging a hot cathode tube and support members in a chassis according to a third embodiment of the present invention.

FIG. 20 is a plan view illustrating a configuration for arranging a hot cathode tube and the support members in a chassis; FIG. 21 is a cross-sectional view taken along the line xxi-xxi of FIG. 20; and FIG. 22 is a cross-sectional view, taken along the line xxi-xxi of FIG. 20, illustrating a state before the support member is attached.

Figure 21:
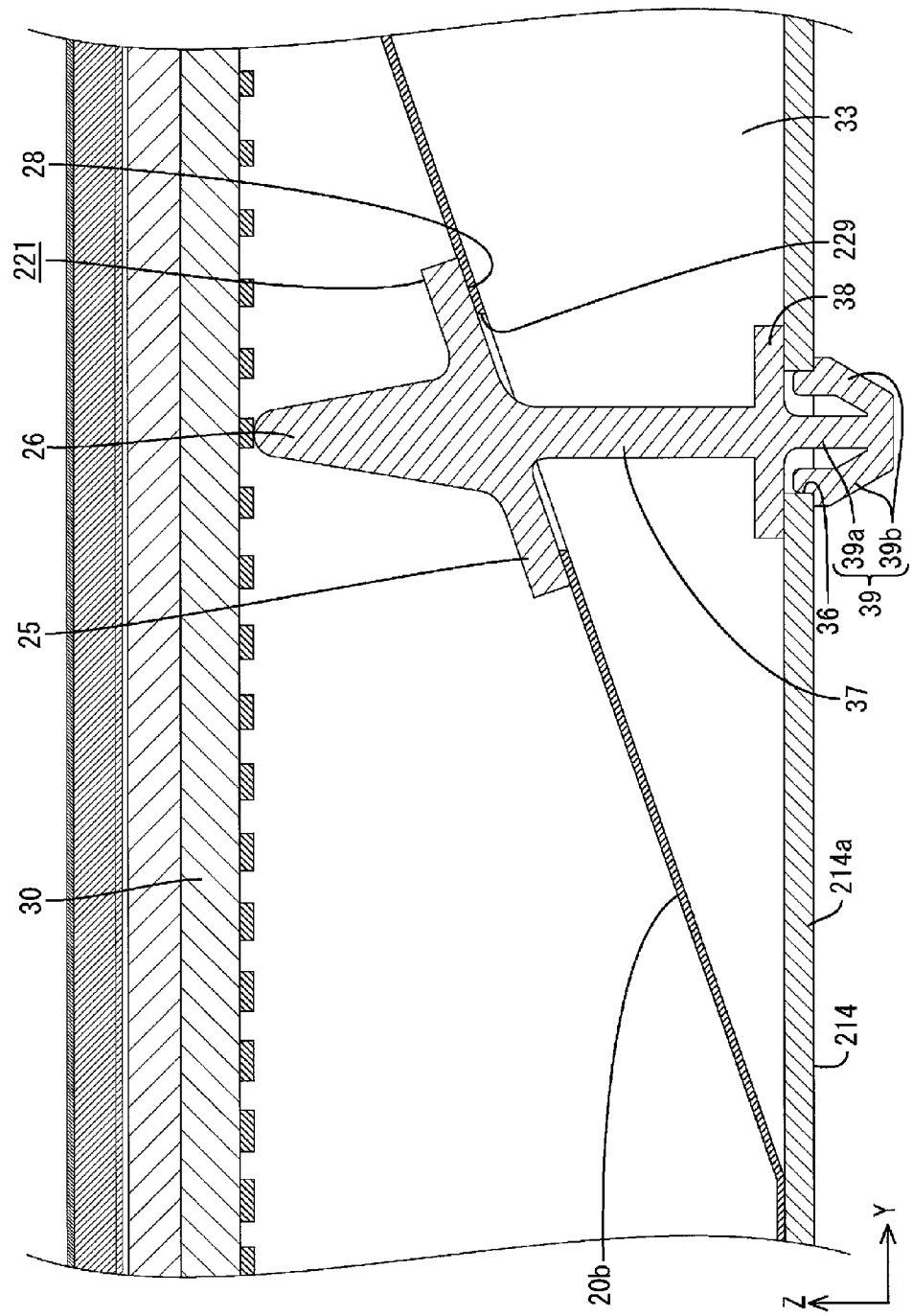
FIG. 21 is a cross-sectional view taken along the line xxi-xxi of FIG. 20.
Figure 22:
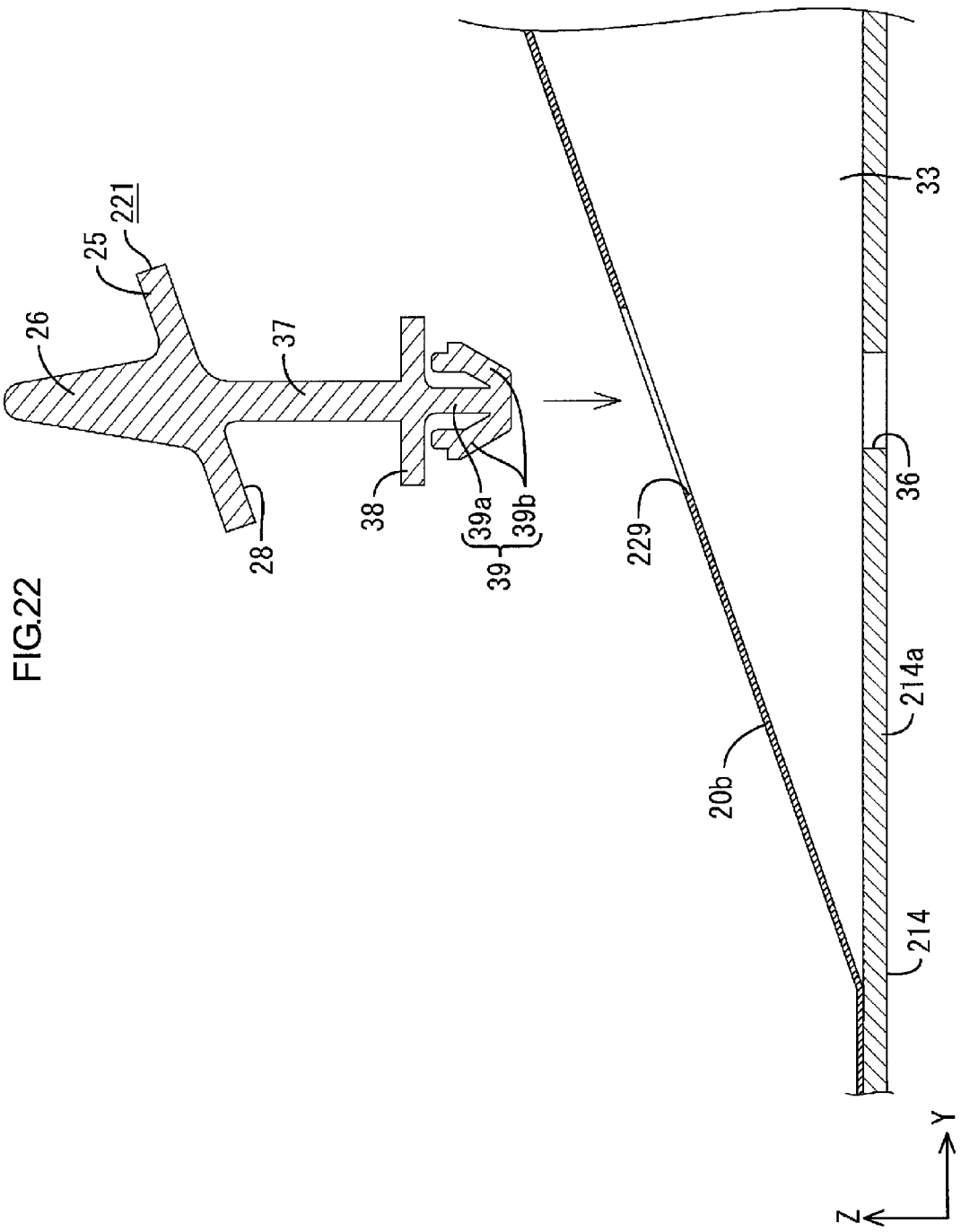
FIG. 22 is a cross-sectional view taken along the line xxi-xxi of FIG. 20, illustrating a state before attachment of the support member.

As shown in FIGS. 20 and 21, the support members 221 are attached to a bottom panel 214a of the chassis 214, and is arranged in positions not overlapping with the receiving portions 33 in a plan view. Specifically, the four support members 221 are arranged inside the chassis 214a in a zigzag pattern in a plan view because sets, each consisting of two of the four support members 221, are arranged in the respective light-source non-arrangement areas LN of the bottom panel 214a and in positions intentionally misaligned with each other in the X-axis direction. Each of the support members 221 is arranged, in the bottom panel 214a, at a position substantially middle of two of the receiving portions 33 that are next to each other along the X-axis direction. Additionally, parts in the bottom panel 214a to which the respective support members 221 are attached include attachment holes 36 in a manner allowing the attachment holes 36 to penetrate the bottom panel 214a along the Z-axis direction, the attachment holes 36 being used for attaching the respective support members 221. Correspondingly, each of the support members 221 includes: a shaft portion 37 projecting backward from the pressing portion 25; a bottom panel pressing portion 38 provided to the projection tip of the shaft portion 37 and configured to press the bottom panel 214a from the frontward side; and an attachment portion 39 projecting backward from the bottom panel pressing portion 38 and being enabled to engage with the hole edge of the attachment hole 36 in the bottom panel 214a from the backward side by being inserted through the attachment hole 36.

The shaft portion 37 is arranged at a position, on the pressing portion 25, that overlaps in a plan view, and makes the shaft portion 37 coaxial with, the support portion 26 which faces frontward. The bottom panel pressing portion 38 is parallel to the bottom panel 214a, has a platy shape substantially straight along the X-axis direction and the Y-axis direction, and has the plate surfaces thereof intersecting the plate surfaces of the pressing portion 25 which are sloping with respect to the Y-axis direction. The bottom panel pressing portion 38 is sized smaller than the pressing portion 25 in a plane view, thereby being small enough to be completely hidden behind the pressing portion 25 when viewed from the front. The rising portions 20b have insertion holes 229 through which to insert the bottom panel pressing portions 38 and the attachment portions 39. Each of the insertion hole 229 is, in a plane view, sized slightly larger than the bottom panel pressing portion 38 but smaller than the pressing portion 25. Thus, the pressing surface 28 of the pressing portion 25 is enabled to press a part around the insertion hole 229 in the rising portion 20b from the frontward side.

The attachment portion 39 is arranged at a position, on the bottom panel pressing portion 38, that overlaps in a plan view, and makes the attachment portion 39 coaxial with, the shaft portion 37 which faces frontward. The attachment portion 39 is composed of: a base portion 39a projecting backward from the bottom panel pressing portion 38; and a pair of engagement portions 39b folded back from the projection end of the base portion 39a toward the bottom panel pressing portion 38. When the attachment portion 39 is inserted into the attachment hole 14b of the bottom panel 214a after having been inserted through the insertion hole 229 of the rising portion 20b from the state shown in FIG. 22, both of the engagement portions 39b thereof elastically deform temporarily in the middle of the insertion. Then, as shown in FIG. 21, when the attachment portions 39 reach the deepest insertion points, these engagement portions 39b restore the original shapes, and, at the same time, the tip portions thereof engage with the hole edge of the attachment hole 36 from the backward side. Thus, it is possible to keep the support members 221 attached to the chassis 214.

As described above, according to this embodiment, the support members 221 are attached to the bottom panel 214a. Therefore, as compared to the first embodiment described above in which the support members 21 are not allowed to be placed at positions not corresponding to the receiving portions 33, this embodiment allows a higher flexibility in determining positions at which to attach the support members 221 inside the chassis 214. It is thereby possible to support the diffuser plate 30 by using the support members 221 located at more appropriate positions.

Fourth Embodiment

A fourth embodiment of the present invention will be described with reference to FIGS. 23 to 25. The fourth embodiment herein shows an example obtained by changing the shape of a reflection sheet 320 and the arrangement of the receiving portions 333 and the support members 21. In this embodiment, the support members 21 each having the same structure as that described in the first embodiment are used. Note that redundant description on structures, operation and effect similar to those of the first embodiment described above is not repeated here.

Figure 23:
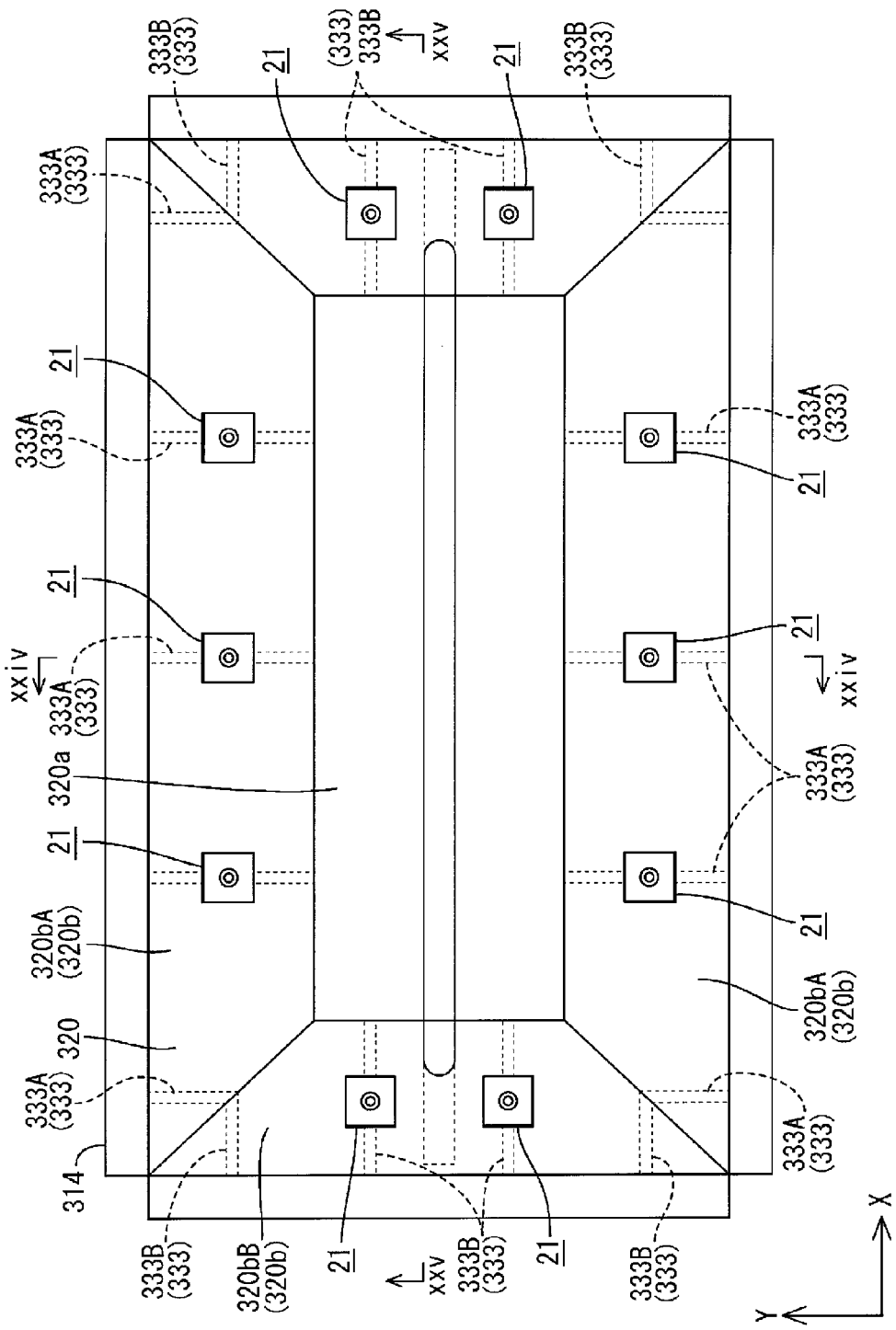
FIG. 23 is a plan view illustrating a configuration for arranging a hot cathode tube and support members in a chassis according to a fourth embodiment of the present invention.

FIG. 23 is a plan view illustrating a configuration for arranging a hot cathode tube and support members in a chassis; FIG. 24 is a cross-sectional view taken along the line xxiv-xxiv of FIG. 23; and FIG. 25 is a cross-sectional view taken along the line xxv-xxv of FIG. 23.

Figure 24:
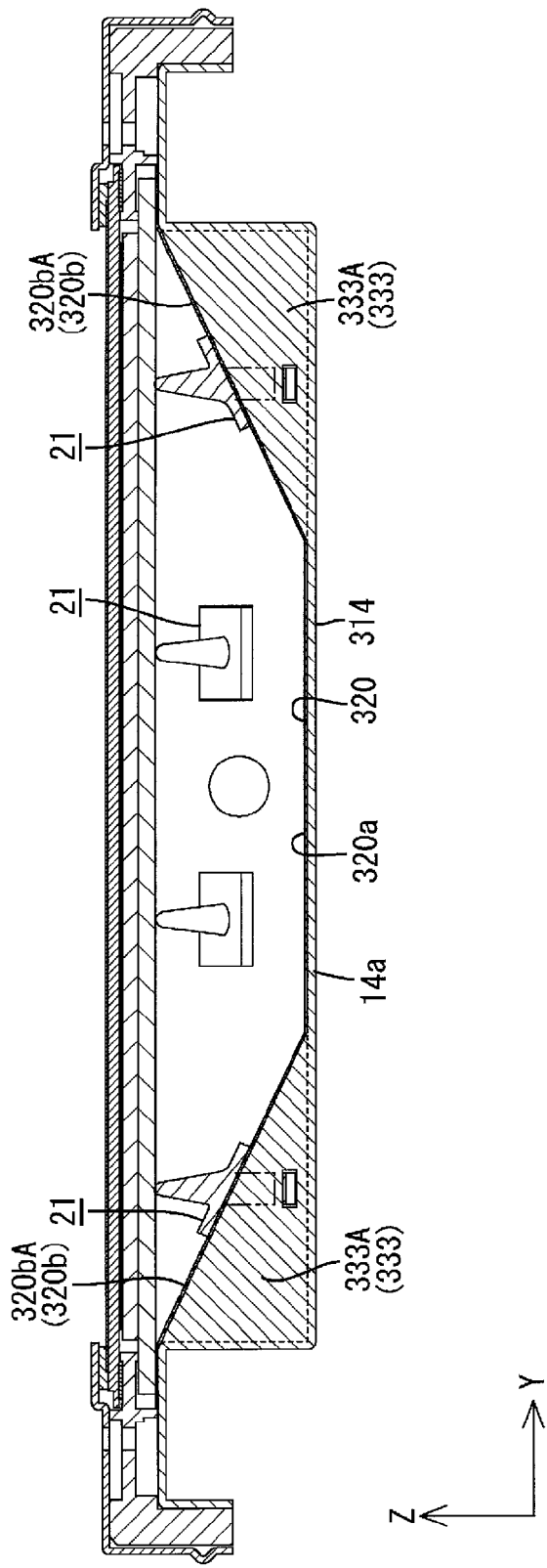
FIG. 24 is a cross-sectional view taken along the line xxiv-xxiv of FIG. 23.
Figure 25:
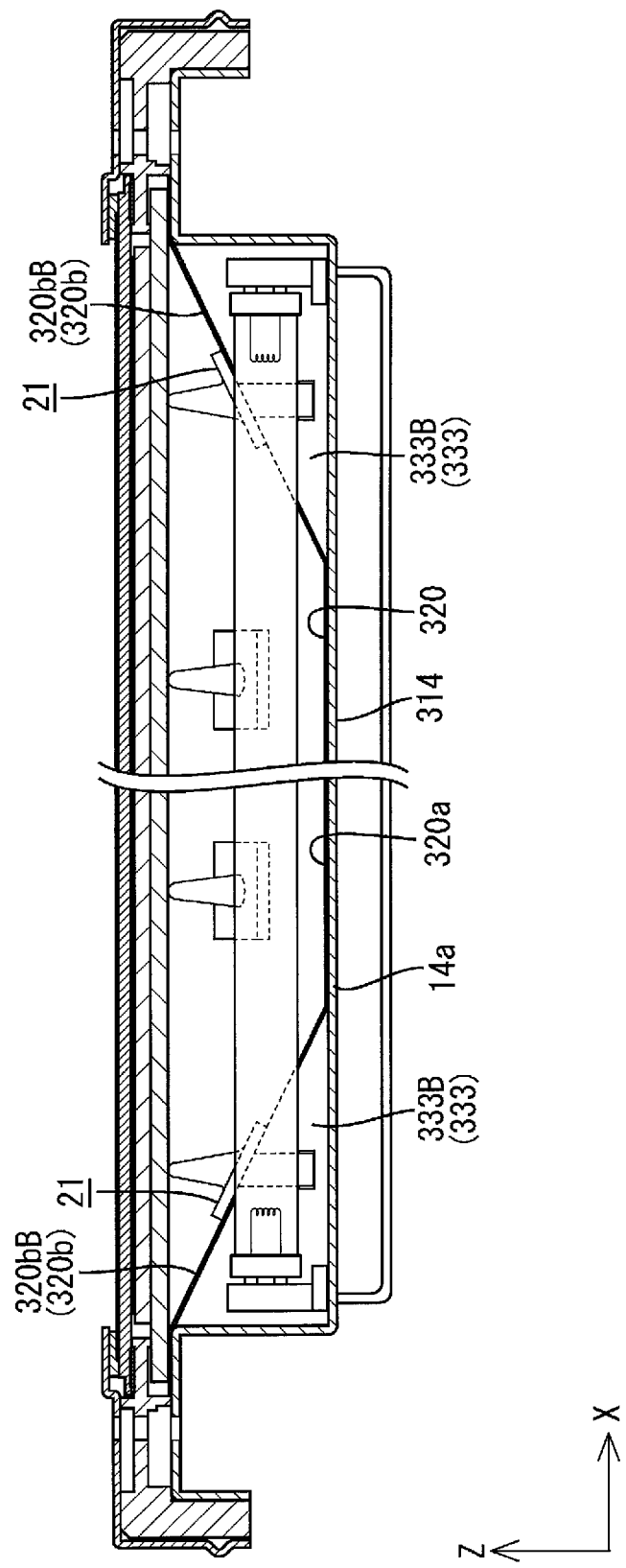
FIG. 25 is a cross-sectional view taken along the line xxv-xxv of FIG. 23.

As shown in FIGS. 23 to 25, the reflection sheet 320 as a whole is bowl-shaped, and includes: a bottom portion 320a arranged in the central part in the bottom panel 14a of the chassis 314; and a total of four rising portions 320b standing up from both end portions of the bottom portion 320a that face the long sides thereof and from both end portions thereof that face the short sides thereof, respectively. The rising portions 320b are composed of: a pair of first rising portions 320bA standing up from the opposite end portions of the bottom portion 320a that face the long sides thereof and arranged in positions sandwiching the bottom portion 320a along the Y-axis direction; and a pair of second rising portions 320bB rising from the opposite end portions of the bottom portion 320a that face the short sides thereof, arranged to sandwich the bottom section 320a therebetween along the X-axis direction, and next to the first rising portion 320bA. The respective first rising portions 320bA and second rising portions 320b have sloping shapes standing up from the bottom portion 320a while forming predetermined rising angles therewith. The first rising portion 320bA and second rising portion 320bB are formed continuously from each other, and are bent at boundary positions therebetween.

Receiving portions 333 are composed of: first receiving portions 333A arranged in positions overlapping with the first start portions 320bA in a plan view; and second receiving portions 333B arranged in positions overlapping with the second rising portions 320bB in a plan view. While each of the first receiving portions 333A is configured in a wall-like shape in which the main wall surface thereof extending along the Y-axis direction, each of the second receiving portions 333B is configured in a wall-like shape in which the main wall surface extends along the X-axis direction. There is a relation between the first receiving portion 333A and the second receiving portion 333B such that the main wall surfaces thereof are substantially orthogonal to (intersecting) each other. The first receiving portions 333A are arranged in a manner such that five thereof are arranged side by side in positions spaced apart from one another along the X-axis direction. Two of these five first receiving portions 333A that are located at both ends thereof are smaller in size than the other three located relatively near to the center thereof. On the other hand, the second receiving portions 333B are arranged in a manner such that four thereof are arranged side by side in positions spaced apart from one another along the Y-axis direction. Two of these four second receiving portions 333B that are located at both ends thereof are smaller in size than the other two located relatively near to the center thereof, and are configured in forms continuing into the first receiving portions 333A that are located at both ends. The support members 21 are attached to the first receiving portion 333A and the second receiving portions 333B that are located relatively near to the centers and large in size.

Fifth Embodiment

The fifth embodiment of the present invention is described with reference to FIG. 26 or FIG. 27. The fifth embodiment herein shows an example obtained by using cold cathode tubes 40 as the light sources and changing the shapes of a reflection sheet 420, support members 421 and receiving portions 433. In this embodiment, the support members 421 each having almost the same structure as that described in the first embodiment are used. Note that redundant description on structures, operation and effect similar to those of the first embodiment described above is not repeated here.

Figure 26:
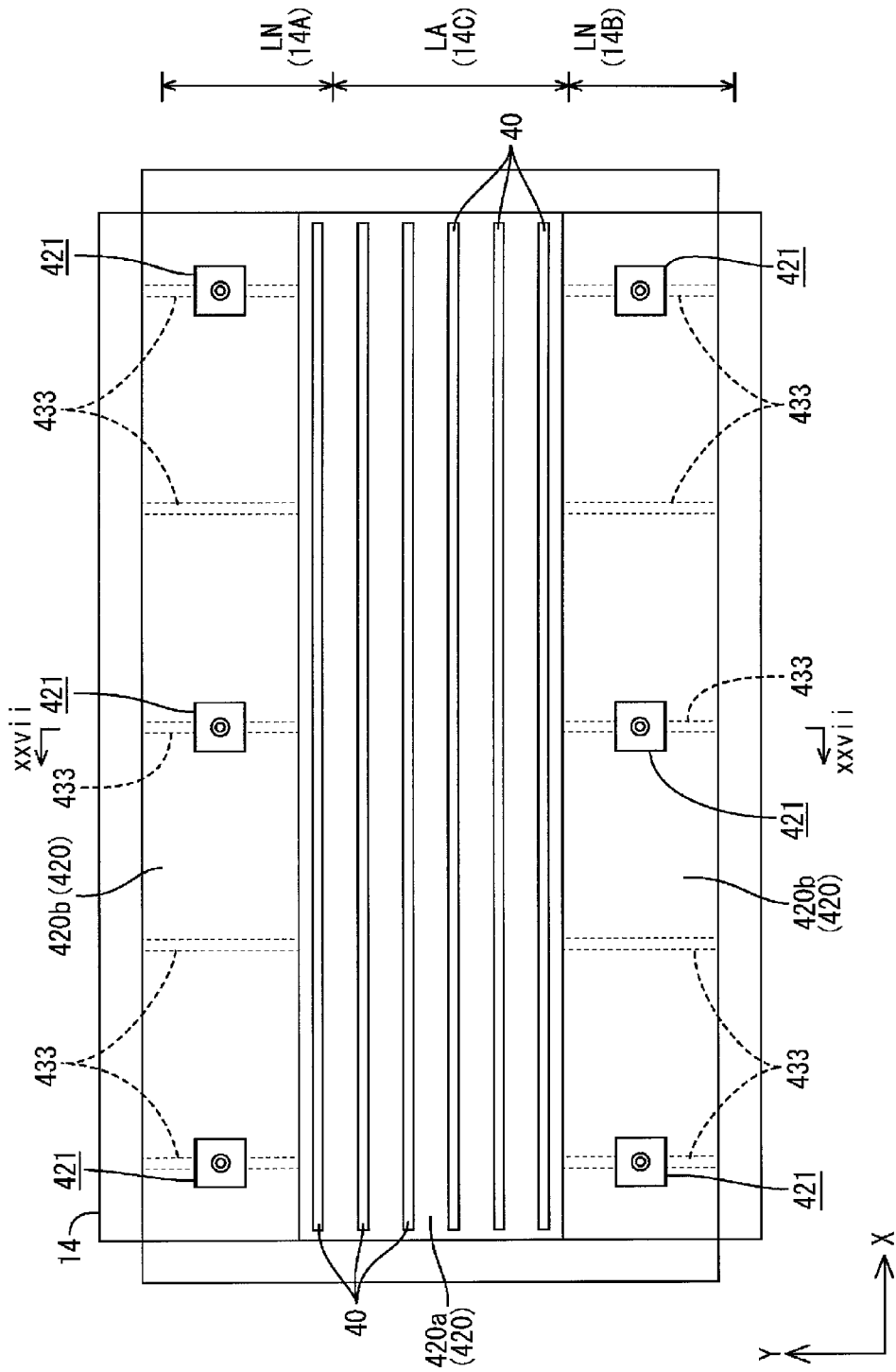
FIG. 26 is a plan view illustrating a configuration for arranging cold cathode tubes and support members in a chassis according to a fifth embodiment of the present invention.
Figure 27:
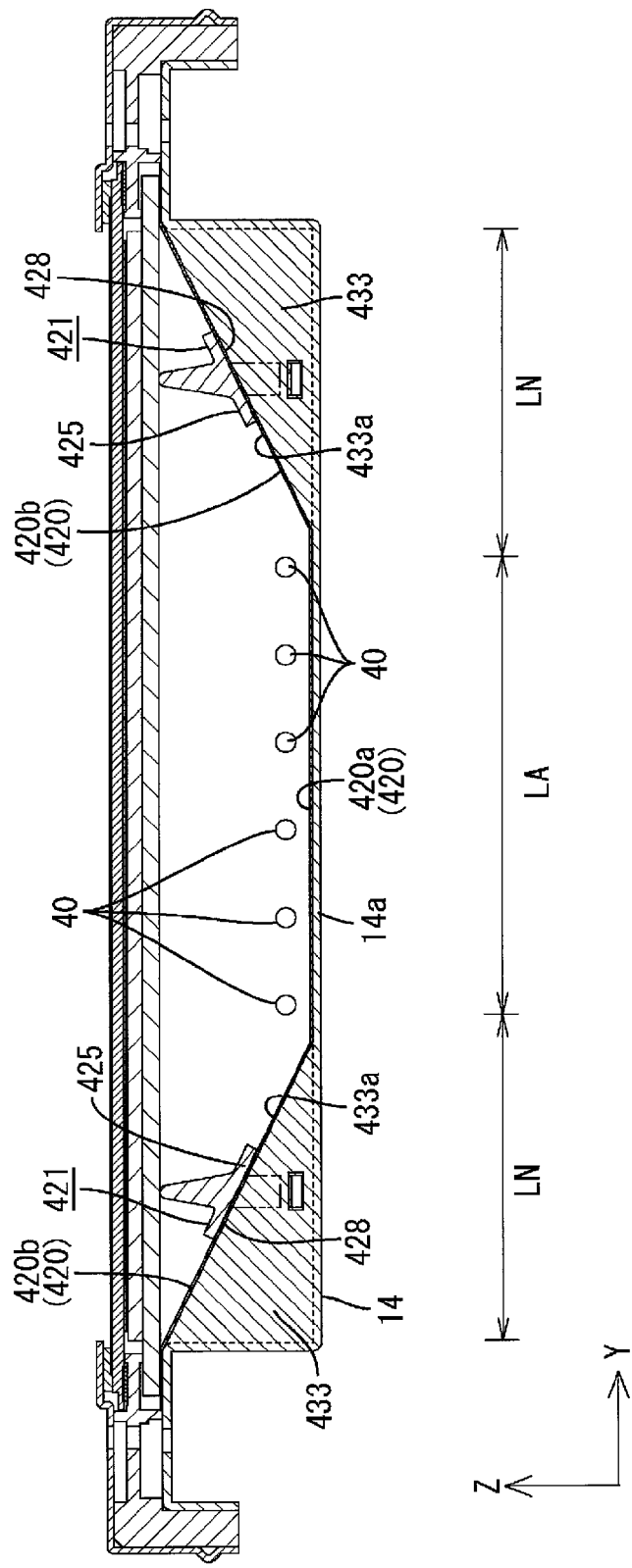
FIG. 27 is a cross-sectional view taken along the line xxvii-xxvii of FIG. 26.

FIG. 26 is a plan view illustrating a configuration for arranging cold cathode tubes and support members in a chassis; and FIG. 27 is a cross-sectional view taken along the line xxvii-xxvii of FIG. 26.

Each of the cold cathode tubes 40 forming the light sources (linear light sources) in this embodiment has a long and narrow, tubular (linear) shape as shown in FIG. 26, and includes: a hollow, long and narrow glass tube, both end portions of which are sealed; and a pair of electrodes placed on the inner sides of the end portions and enclosed in the inside of the glass tube. While mercury, rare gas and the like are enclosed in the inside of the glass tube, the inward wall surface thereof has a fluorescence material applied thereto. Relay connectors (not shown) are arranged on both ends of the cold cathode ray tubes 40, and are connected to lead terminals projecting from the electrodes into the outside of the glass tube. The cold cathode tube 40 is connected through these relay connectors to an inverter board (not shown) attached to the outer surface of the bottom panel 14a of the chassis 14, and the driving thereof is made controllable. The outer diameter of the cold cathode tubes 40 is about 4 mm, for example, which is smaller than the outer diameter of the hot cathode tubes 17 described above in relation to the first embodiment (about 15.5 mm, for example).

The six cold cathode tubes 40 each having the above described structure are arranged parallel to each other, and housed inside the chassis 14 in a manner unevenly distributed with the length direction (the axial direction) thereof agreeing with a direction along the long sides of the chassis 14 at predetermined intervals (arrangement pitches). More specifically, as shown in FIGS. 26 and 27, when the bottom panel 14a (a part facing the diffuser plate 30) of the chassis 14 is evenly divided, in the direction parallel to the short sides thereof, into the first end portion 14A, the second end portion 14B located in an end portion opposite to the first end portion 14A, and the middle portion 14C sandwiched between these end portions, the cold cathode tubes 40 are arranged in the middle portion 14C of the bottom panel 14a. Thus, the light-source arrangement area LA is formed therein. The Light-source arrangement area LA according to this embodiment is larger than in the first embodiment. On the other hand, none of the cold cathode tubes 40 is arranged in the first end portion 14A and the second end portion 14B of the bottom panel 14a. Thus, the light-source non-arrangement areas LN are formed therein. That is, the cold cathode tubes 40 form the light-source arrangement area LA in a manner unevenly distributed and existing only in the middle portion of the bottom panel 14a of the chassis 14 in the direction along the short sides thereof, and the area of the light-source arrangement area LA is smaller than the area of each of the light-source non-arrangement areas LN. Further, the percentage of the area (the length of the Y-axis direction) of the light-source arrangement area LA with respect to the area (the vertical size (the size of the short sides) of the screen) of the whole screen is set to, for example, about 42%, which is larger than that in the first embodiment. Also, the light-source non-arrangement areas LN provided in a pair have areas set substantially equal to each other. Additionally, each of the cold cathode tubes 40 is formed so that the length thereof may be substantially equal to the horizontal size (the size of the long sides) of the screen.

The bottom portion 420a in the reflection sheet 420 has the size of the short sides thereof set slightly wider than the light-source arrangement area LA in the bottom panel 14a of the chassis 14, and overlaps with the light-source arrangement area LA in a plan view. That is, a range across which the bottom portion 420a is formed is enlarged in accordance with the size of the light-source arrangement area LA. Accordingly, ranges across which the respective rising portions 420b are formed in a manner corresponding to the light-source non-arrangement areas LN are reduced. Therefore, the rising angles at which the rising portions 420b rise from the bottom portion 420a are set larger than in the first embodiment. Further, because of these changes in the rising angles of the rising portions 420b, angles that pressing surfaces 428 of pressing portions 425 in the support members 421 form with the Y-axis direction, and angles that receiving surfaces 433a of the receiving portions 433 form with the Y-axis direction are correspondingly changed.

As described above, according to this embodiment, the light sources are composed of the cold cathode tubes 40. This configuration makes it possible to extend the product life, and to carry out dimming without difficulty.

Sixth Embodiment

A sixth embodiment of the present invention is described with reference to FIG. 28 or FIG. 29. The sixth embodiment herein shows an example obtained by using LEDs 50 as the light sources. In this embodiment, the support members 21 each having the substantially same structure as that described in the first embodiment are used. Note that redundant description on structures, operation and effect similar to those of the first embodiment described above is not repeated here.

Figure 28:
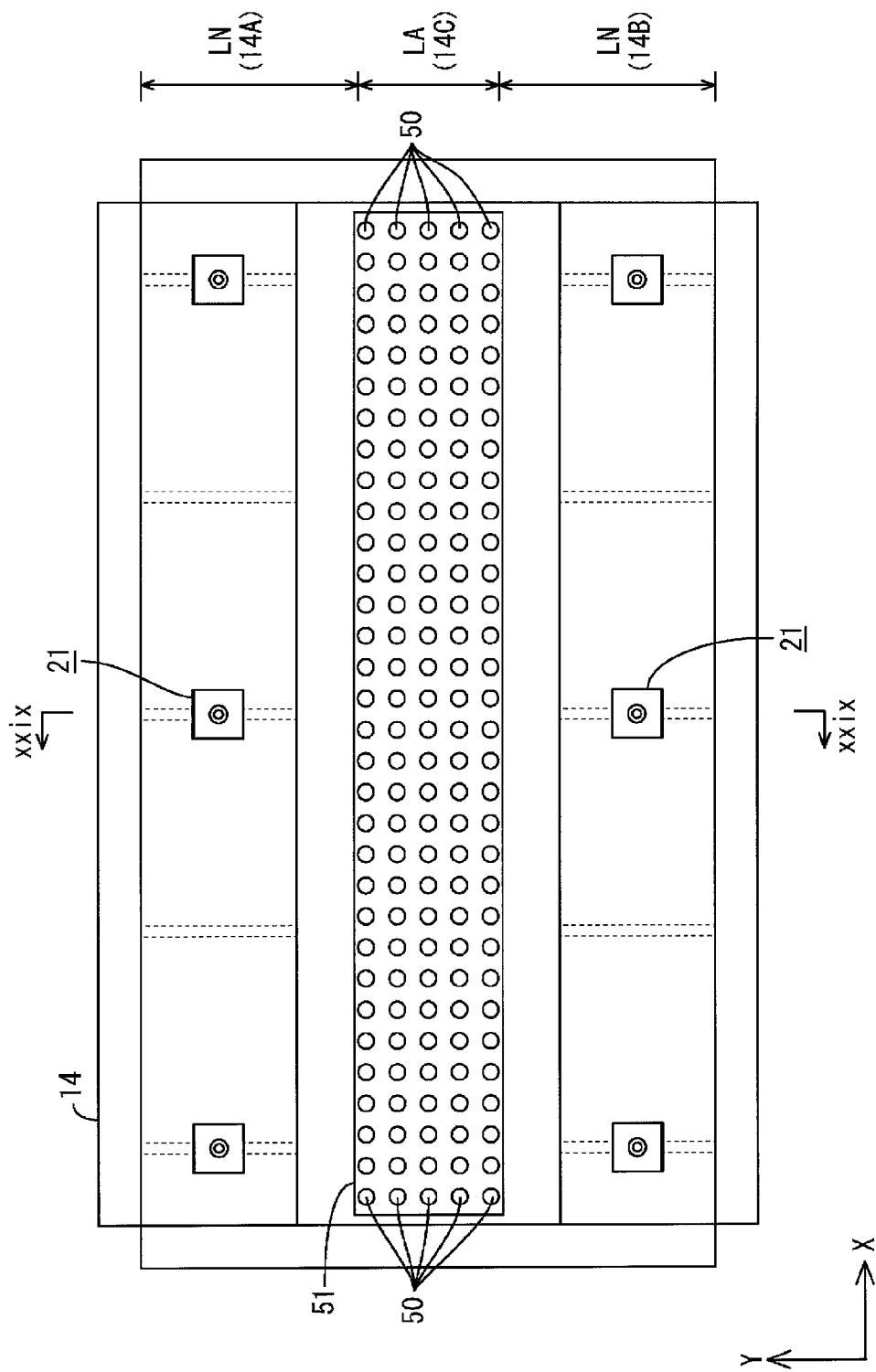
FIG. 28 is a plan view illustrating a configuration for arranging LEDs and support members in a chassis according to a sixth embodiment of the present invention.
Figure 29:
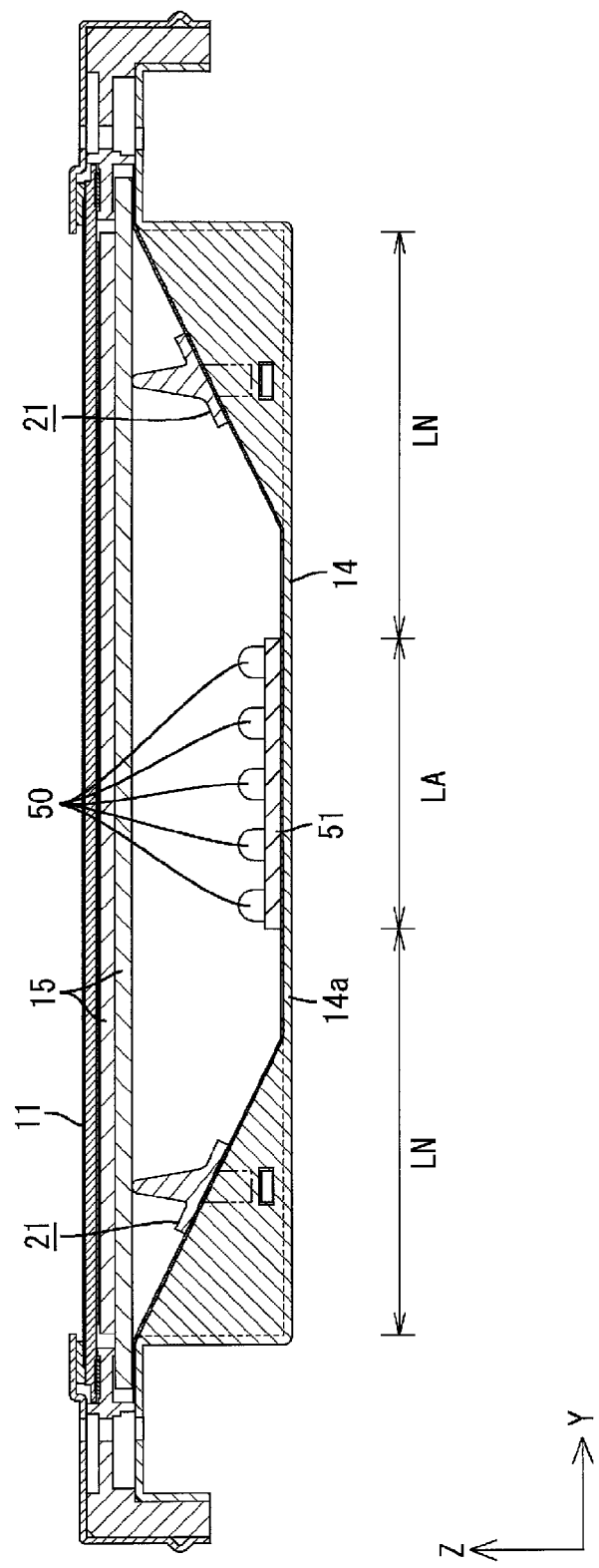
FIG. 29 is a cross-sectional view taken along the line xxix-xxix of FIG. 28.

FIG. 28 is a plan view illustrating a configuration for arranging LEDs and support members in a chassis; and FIG. 29 is a cross-sectional view taken along the line xxix-xxix of FIG. 28.

As shown in FIGS. 28 and 29, the LEDs 50 forming the light sources in this embodiment, the number of which is large, as a whole constitute a linear light source by being mounted on an LED board 51 housed inside the chassis 14, the linear light source extending along the X-axis direction. The LED board 51 is made of synthetic resin, the outer surface of which appears in a white color excellent in light reflectance. The LED board 51 is arranged so as to extend along the bottom panel 14a of the chassis 14, and is fixed to the bottom panel 14a by use of fixation means not illustrated. The LED board 51 has a horizontally-long rectangular shape in a plan view, and is attached to the bottom panel 14a with a direction along the long sides thereof agreeing with the direction along the long sides of the chassis 14. While the size of the short sides of the LED board 51 is set smaller than the vertical size (the size of the short sides of the chassis 14) of the screen, the size of the long sides of the LED board 51 is set substantially equal to the horizontal size (the size of the long sides of the chassis 14) of the screen. Further, while a wiring pattern formed of a metal film is formed on the LED board 51, the LEDs 50 are mounted at predetermined positions thereon. An external control board, not illustrated, is connected to this LED board 51 to supply power necessary for lighting of the LEDs 50 and enable driving control of the LEDs 50.

The type of the LEDs 50 is so-called a surface-mount type, which means that the LEDs 50 are surface-mounted the on LED board 51. The multiple LEDs 50 are arranged in parallel to each other on the frontward surface of the LED board 51 in a grid (in a matrix) along the X-axis direction and along the Y-axis direction. Each of the LEDs 50 has a configuration obtained by sealing up, on a base to be adhered to the LED board 51, an LED chip with a resin material. The LED chips mounted on the base include three kinds which emit light having different dominant wavelengths. Specifically, each of the LED chips is configured to emit light of a single color which is any one of R (red), G (green) and B (blue). Each of the LEDs 50 is configured as a top-emission type LED, a surface of which opposite to a surface thereof facing toward the LED board 51 when the LED is mounted serves as a light emitting surface. The optical axis of the LED 50 substantially agrees with the Z-axis direction (a direction orthogonal to the plate surfaces of the liquid crystal panel 11 and the optical member 15).

When the bottom panel 14a (a part facing the diffuser plate 30) of the chassis 14 is evenly divided, in the direction along the short sides thereof, into the first end portion 14A, the second end portion 14B located in an end portion opposite to the first end portion 14A, and the middle portion 14C sandwiched between these end portions, the LED board 51 having the multiple LEDs 50 mounted thereon is arranged in the middle portion 14C of the bottom panel 14a. Thus, the light-source arrangement area LA is formed therein. On the other hand, the LED board 51 is not arranged in the first end portion 14A and the second end portion 14B of the bottom panel 14a. Thus, the light-source non-arrangement areas LN are formed therein. That is, the LEDs 50 and the LED board 51 form the light-source arrangement area LA in a manner unevenly distributed and existing only in the middle portion of the bottom panel 14a of the chassis 14 in the direction along the short sides thereof. Note that the percentage of the area (the length of the Y-axis direction) of the light-source arrangement area LA with respect to the area (the vertical size (the size of the short sides) of the screen) of the whole screen may be set as appropriate, and may be either set to any one of the values shown in the first or fifth embodiment or set to any value other than those shown in the first and fifth embodiments.

As described above, according to this embodiment, the light sources are formed of the LEDs 50. This configuration makes it possible to achieve extension of the product life, reduction in power consumption thereof, and the like.

Other Embodiments

The invention is not limited to the embodiments described in the foregoing text and the drawings. The following embodiments are also included in the technical scope of the invention, for example.

(1) Each of the above embodiments shows a case where the angle that the pressing surface (the receiving surface in the receiving portion) in the pressing portion forms with the Y-axis direction is set substantially equal to the rising angle of the rising portion with respect to the bottom portion. However, the present invention also includes a case where the angle that the pressing surface (the receiving surface) forms with the Y-axis direction is set larger, or set lower in an opposite manner, than the rising angle of the rising portion.

(2) Each of the above embodiments shows, as an example, a case where the pressing portion and the rising portion are configured in almost identical sloping shapes. However, the pressing portion and the rising portion may be configured in different shapes. For example, also applicable is a case where the pressing portion and the rising portion have an arc-like shape (a curved shape) and a sloping shape, respectively, or the other way around. Likewise, the shape of the receiving portion may be set different from only one of those of the pressing portion and the rising portion.

(3) Each of the above embodiments shows, as an example, a case where the angle that the pressing surface (the receiving surface in the receiving portion) in the pressing portion forms with the Y-axis direction, and the rising angle of the rising portion are set to acute angles equal to or smaller than 45 degrees. However, the present invention also includes a case where those angles are set to acute angles of 45 degrees or more.

(4) Each of the first and second embodiments above shows a case where only one (the first attachment piece) of the attachment pieces in each pair included in the support member has the engagement projection. However, both of these paired attachment pieces may have the engagement projections.

(5) Each of the first and second embodiments above shows a case where, while the attachment pieces in the support member have the engagement projection, the receiving portion includes the engagement hole. However, also applicable is a case where, in an opposite manner, while the attachment pieces in the support member have the engagement hole, the receiving portion has the engagement projection.

(6) Each of the first and second embodiments above shows a case where the support member and the receiving portion have the engagement projection and the engagement hole, respectively. However, the engagement projection and the engagement hole may be omitted. In this case, the support member is enabled to keep hold of the receiving member by catching the receiving portion between the paired attachment pieces. In this case, it is preferable that the elasticity of the paired attachment pieces catching the receiving portion be brought into action with the attachment pieces elastically spaced slightly more apart from each other.

(7) Positions to which the support members are attached inside the chassis are not limited to those in the above embodiments and may be changed as appropriate. Likewise, positions at which the receiving portions are installed inside the chassis may be changed as appropriate.

(8) The specific planar shape and cross-sectional shape of the receiving portion are not limited to those in the above embodiments and may be changed as appropriate.

(9) Each of the above embodiments shows, as an example, a case where the chassis has the receiving portions. However, in a case where the structure described in the third embodiment is adopted as a structure for attaching the support members, the receiving portions may be omitted. This case allows a higher flexibility in determining positions at which to attach the support members inside the chassis, and therefore makes it possible to more suitably support the optical members.

(10) Each of the above embodiments shows, as an example, a case where the axial direction of the support portion agrees with the Z-axis direction. However, the present invention also includes a case where the axial direction in the support portion inclines to some extent to the Z-axis direction. The axial direction of the attachment piece may be changed likewise.

(11) The third embodiment above shows a case where, while the bottom panel of the chassis has the attachment holes, each of the support members has the bottom panel pressing portion and the attachment portion. However, the attachment holes and the attachment portions may be omitted. In this case, it is only required that the bottom panel pressing portions be adhered to the bottom panel by means of an adhesive or double-sided tape.

(12) The first and third embodiments above describe two kinds of support member that are different in structure for attachment thereof to the chassis, respectively. However, it goes without saying that these two kinds of support member may be used in combination inside one chassis.

(13) In each of the fourth to sixth embodiments above, support members of the kind described in the third embodiment may be used as the support members.

(14) The second embodiment above shows a case where the first receiving portion and the second receiving portion are substantially orthogonal to each other in a plan view. However, an angle formed between the first receiving portion and the second receiving portion may be changed to an angle that is not a right angle.

(15) Although each of the above embodiments shows a case where a chassis made of synthetic resin is used as the chassis, the present invention is applicable also to a chassis made of metal. In this case, the receiving portions may be formed integrally with the bottom panel, for example, by applying a drawing process to the bottom panel. Alternatively, manufacturing the receiving portions as separate components made of synthetic resin and then attaching the receiving portions to a metal chassis is also acceptable.

(16) Each of the above embodiments shows, as an example, a case where the pressing portions are configured to press parts of the rising portions in the directions oriented away from the bottom portion toward the rising portions. However, the present invention also includes a case where the pressing portions are configured to press the whole lengths of the rising portions in the directions oriented away from the bottom portion toward the rising portions.

(17) Each of the above embodiments shows a case where the bottom panel of the chassis is arranged across a range that overlaps with the rising portions in a plan view. However, the present invention also includes a case where the bottom panel is formed across a range overlapping only with the bottom portion in a plan view. In this case, portions of the chassis that overlap with the rising portions may be configured in forms standing up from the bottom panel in conformity with the rising portions.

(18) Each of the above embodiments shows a case where the rising portions are arranged in end portions of the reflection sheet. However, the present invention is applicable also to a case where a rising portion having a cross-sectional shape like a mound is provided in the relatively central part of the reflection sheet. In that case, it is only required that the support members be attached to positions corresponding to the rising portion.

(19) Each of the above embodiments shows, as an example, the reflection sheet configured such that the bottom portions and each of the rising portions continue into each other. However, the present invention is applicable also to a case using the reflection sheet having a block construction where the bottom portion is separated from each of the rising portions.

(20) In the fourth embodiment above, the cold cathode tubes described in the fifth embodiment or the LEDs described in the sixth embodiment may be used as the light sources.

(21) Each of the above embodiments shows, as an example, a case where the outer surfaces of the support members appear in a white color. However, the color of the outer surfaces of the support members may be, for example, milky-white or silver. Additionally, a color may be given to the outer surfaces by applying paint of a desired color to the outer surfaces of the support members.

(22) Each of the above embodiments shows a case where the support portions are allowed to abut the diffuser plate under the condition that the diffuser plate is straight along the X-axis direction and along the Y-axis direction. However, the present invention also includes a case where the support portions are not allowed to abut the diffuser plate under the condition that the diffuser plate is thus straight (specifically, the projection top ends of the support portions are configured to be displaced from the surface of the diffuser plate near the light source toward the light source). This configuration permits, for example, even in a case where the diffuser plate has thermally expanded due to a change in the thermal environment of the backlight unit, the diffuser plate to deform in a manner being toward the light source within the range of a clearance held between the diffuser plate and each of the support portions. This makes bending and wrinkling unlikely to occur in the diffuser plate, and can make uneven brightness unlikely to occur in the illumination light emitted from the diffuser plate.

(23) The first embodiment above shows a case where one hot cathode tube is used as the light source. However, the number of hot cathode tubes to be used may be changed and may be two or more. Specifically, in a case where two hot cathode tubes are used for example, it is preferable that the percentage of the light-source arrangement area with respect to the vertical size of the screen be set to, for example, about 37%. Besides, in a case where three or more hot cathode tubes are used, it is only required that the above percentage of the light-source arrangement area be adjusted in proportion to the number of hot cathode tubes.

(24) The fifth embodiment shows a case where the six cold cathode tubes are used as the light sources. However, the number of cold cathode tubes to be used may be changed, and may be either five or less or seven or more. Specifically, in a case where four cold cathode tubes are used for example, it is preferable that the percentage of the light-source arrangement area with respect to the vertical size of the screen be set to, for example, about 26%. Further, in a case where eight cold cathode tubes are used, it is preferable that the percentage of the light-source arrangement area with respect to the vertical size of the screen be set to, for example, about 58%. In a case where the number of hot cathode tubes is changed to another number, it is only required that the above percentage of the light-source arrangement area be adjusted in proportion to the number of cold cathode tubes to be used.

(25) In the sixth embodiment above, the size of the LED board relative to the chassis, positions on the LED board at which the LEDs are placed, the number of the LEDs to be placed thereon, and the like may be changed as appropriate.

(26) Each of the above embodiments shows a case where, inside the chassis, the middle portion and the first and second end portions are set as the light-source arrangement area and the light-source non-arrangement area, respectively. However, the present invention also includes a case where, inside the chassis, at least one of the first and second end portions may be set as the light-source arrangement area and the other portions may be set as the light-source non-arrangement areas. In this case, the first end portion and the middle portion may be set as the light-source arrangement areas, or, alternatively, the second end portion and the middle portion may be set as the light-source arrangement areas.

(27) Each of the above embodiments shows a case where the light source is, or the light sources are, arranged so as to be unevenly distributed (the light-source arrangement area and the light-source non-arrangement areas are included) inside the chassis. However, the present invention is applicable also to a case configured to have the light source or the light sources arranged evenly all over inside the chassis.

(28) Each of the first to fifth embodiments above shows a case where a hot cathode tube or cold cathode tube, which is categorized as one kind of fluorescent tube (linear light source), is used as the light source. However, the present invention also includes a case where another kind of fluorescent tube is used. The present invention also includes a case where a discharge tube (such as a mercury lamp) not categorized as a fluorescent tube is used.

(29) The sixth embodiment above shows a case where LEDs, which are categorized as one kind of point light source, are used as the light sources. However, the present invention also includes a case where another kind of point light source is used. Other than these kinds, a surface light source such as organic EL may be used.

(30) In the foregoing embodiments, one kind of light source is used. However, the invention also includes an arrangement using in mixture a plurality of kinds of light sources. Specifically, hot cathode tubes and cold cathode tubes may be used in mixture, hot cathode tubes and LEDs may be used in mixture, or cold cathode tubes and LEDs may be used in mixture, or hot cathode tubes and cold cathode tubes and LEDs may be used in mixture.

(31) Although each of the dots in the dot pattern constituting the light reflecting portion in the diffuser plate is configured in a circular shape in each of the above embodiments, the shape of each of the dots is not limited to this. An arbitrary shape such as an oval shape or a polygonal shape may be selected therefor.

(32) Although the light reflecting portion is formed on the surface of the diffuser plate by applying printing thereto in each of the above embodiments, the present invention also includes the light reflecting portion formed by use of another method such as metal vapor deposition.

(33) In each of the above embodiments, the light reflecting portion is formed on the surface of the diffuser plate so that the light reflectance within the surface of the diffuser plate may be adjusted. However, the light reflectance of the diffuser plate itself may be adjusted, for example, in the following manner. The diffuser plate in general has a configuration obtained by dispersing light diffusing particles in a light transmissive substrate. On this basis, it is possible to determine the light reflectance of the diffuser plate itself by controlling the blending ratio (wt. %) of the light diffusing particles to the light transmissive substrate. That is, the light reflectance can be relatively increased by relatively increasing the blending ratio of the light diffusing particles, and the light reflectance can be relatively lowered by relatively lowering a the blending ratio of the light diffusing particles.

(34) In each of the above embodiments, the light reflectance of the diffuser plate is designed and controlled by varying the areas of the respective dots constituting the light reflecting portion. However, the present invention also includes a case where another method, such as, for example, varying arrangement intervals among dots having areas of the same size, or forming dots that are different in light reflectance, is used as means to control the light reflectance. In this case, it is possible to form dots different in light reflectance by forming the respective dots by use of two or more materials different in light reflectance.

(35) Each of the above embodiments shows a case where, with the light reflecting portion formed on the diffuser plate of the optical members, the light reflectance of the light reflecting portion is appropriately controlled. However, the present invention also includes a case where, with the light reflecting portion formed on any one of the optical members that is not the diffuser plate, the light reflectance of the light reflecting portion is appropriately controlled. Further, the numbers and the kinds of diffuser plates and optical sheets, which are used as optical members, may be changed as appropriate.

(36) The screen size and the aspect ratio of the liquid crystal display device may be changed from the above described embodiments, if necessary.

(37) In the foregoing embodiments, the liquid crystal panel and the chassis are placed in a vertical state with the shorter side thereof aligned to the vertical direction. Besides, the invention also includes an arrangement where the liquid crystal panel and the chassis are placed in a vertical state with the longer side thereof aligned to the vertical direction.

(38) In the foregoing embodiments, TFTs are used as a switching component of the liquid crystal display device. Besides, the invention is also applicable to other liquid crystal display devices using a switching component other than TFTs (thin-film diodes (TFDs), for example). In addition, the invention is also applicable to both liquid crystal display devices of color representation and liquid crystal display devices of black and white representation.

(39) In the foregoing embodiments, the liquid crystal display device uses the liquid crystal panel as a display panel. Besides, the invention is also applicable to display devices using any other kind of display panel.

(40) In the foregoing embodiments, the television receiver includes a tuner. Besides, the invention is also applicable to display devices not including a tuner.

The invention claimed is:
1. A lighting device, comprising:
a light source;
a chassis configured to house the light source;
a reflection sheet arranged inside the chassis and configured to reflect light;
an optical member arranged on a light exit side with respect to the light source so as to face the light source; and
a support member including a support portion that has an axis extending in a space inside the chassis and supports the optical member from a side opposite to the light exit side, the support member further including a pressing surface configured to press the reflection sheet from the light exit side and the pressing surface having a surface plane crossing an axial direction of the support portion and crossing a direction substantially perpendicular to the axial direction; wherein:

the chassis has a bottom plate arranged on a side opposite to the light exit side with respect to the light source, and the reflection sheet includes a bottom portion arranged along the bottom plate, and rising portion rising from the bottom portion toward the light exit side; and the pressing surface of the support member is arranged to overlap with the rising portion in a plan view.

2. The lighting device according to claim 1, wherein:
the pressing surface forms a support angle with the direction perpendicular to the axial direction and rising portion forms a rising angle with the bottom portion; and
the support angle is substantially equal to the rising angle.

3. The lighting device according to claim 1, wherein the support angle that the pressing surface forms with the direction perpendicular to the axial direction and the rising angle rising portion that the rising portion forms with the bottom portion are acute angles.

4. The lighting device according to claim 1, wherein the bottom plate of the chassis is arranged to overlap with the rising portion in a plan view.

5. The lighting device according to claim 4, further comprising a receiving portion provided between the bottom plate and the rising portion and configured to receive the rising portion from a side opposite to the light exit side.

6. The lighting device according to claim 5, wherein the support member is attached to the receiving portion.

7. The lighting device according to claim 6, wherein:
the receiving portion has a wall-like shape standing up from the bottom plate toward the light exit side; and
the support member has a pair of attachment pieces configured to sandwich a wall thickness of the receiving portion therebetween and hold the receiving portion.

8. The lighting device according to claim 7, wherein the receiving portion and at least one of the pair of attachment pieces have a coupling structure by which the receiving portion and one of the attachment pieces are coupled to each other.

9. The lighting device according to claim 8, wherein the coupling structure includes:
a coupling projection provided to at least one of the pair of attachment pieces and projecting toward the receiving portion; and
a coupling hole provided to the receiving portion and configured to receive the coupling projection.

10. The lighting device according to claim 5, wherein:
the receiving portion includes a first receiving portion and a second receiving portion, and each of the first receiving portion and the second receiving portion has a wall-like shape standing up from the bottom plate toward the light exit side, and the first receiving portion and the second receiving portion cross each other in a plan view; and
the first receiving portion and the second receiving portion are formed continuously from each other.

11. The lighting device according to claim 4, wherein:
the chassis has a side plate at an end of the bottom, and the side plate standing up toward the light exit side, and the side plate has an receiving plate outwardly extending from an end of the side plate; and
the rising portion of the reflection sheet has an extending portion at an end thereof extending along the receiving plate.

12. The lighting device according to claim 1, wherein the pressing surface of the support member is configured to partially press the rising portion in a direction from the bottom portion to the rising portion rising portion.

13. The lighting device according to claim 1, wherein the pressing surface and the rising portion are sloped.

14. The lighting device according to claim 1, wherein the axial direction of the support portion is substantially perpendicular to a plate surface of the optical member.

15. The lighting device according to claim 1, wherein a direction in which the support member is attached to and detached from the chassis is substantially same as the axial direction of the support portion.

16. The lighting device according to claim 1, wherein the chassis is defined in a light-source arrangement area in which the light source is arranged and a light-source non-arrangement area in which no light source is arranged.

17. The lighting device according to claim 16, wherein:
the chassis is defined in at least a first end portion, a second end portion located at an end opposite to the first end portion, and a middle portion sandwiched between the first end portion and the second end portion; and
the middle portion corresponds to the light-source arrangement area and each of the first end portion and the second end portion corresponds to the light source non-arrangement area.

18. The lighting device according to claim 16, wherein:
the chassis has a bottom plate provided on a side opposite to the light exit side with respect to the light source;
the reflection sheet includes a bottom portion and a rising portion, and the bottom portion is provided along the bottom plate and the rising portion rises from the bottom portion toward the light exit side; and
at least a part of the bottom portion is provided in the light source arrangement area and at least a part of the rising portion is provided in the light-source non-arrangement area.

19. The lighting device according to claim 16, wherein the optical member has a surface facing the light source and at least the surface of the optical member has light reflectance higher in a portion overlapping with the light-source non-arrangement area than in a portion overlapping with the light-source arrangement area.

20. The lighting device according to claim 19, wherein at least the surface of the optical member facing the light source has the light reflectance decreasing as is far away from the light source.

21. The lighting device according to claim 1, wherein the support member has a white surface.

22. The lighting device according to claim 1, wherein the light source is a hot cathode tube.

23. The lighting device according to claim 1, wherein the light source is a cold cathode tube.

24. The lighting device according to claim 1, wherein the light source is an LED.

25. A display device comprising:
the lighting device according to claim 1; and
a display panel configured to provide display by using light emitted from the lighting device.

26. The display device according to claim 25, wherein the display panel is a liquid crystal panel having liquid crystal contained between a pair of substrates.

27. A television receiver comprising the display device according to claim 25.

* * * * *